(12) United States Patent
Ralston

(10) Patent No.: US 10,589,473 B2
(45) Date of Patent: Mar. 17, 2020

(54) METHOD AND APPARATUS FOR WELDING A ROOFING MEMBRANE

(71) Applicant: Miller Weldmaster Corporation, Navarre, OH (US)

(72) Inventor: Zachary J. Ralston, Canton, OH (US)

(73) Assignee: Miller Weldmaster Corporation, Navarre, OH (US)

( * ) Notice: Subject to any disclaimer, the term of this patent is extended or adjusted under 35 U.S.C. 154(b) by 0 days.

(21) Appl. No.: 16/189,433

(22) Filed: Nov. 13, 2018

(65) Prior Publication Data

US 2019/0077090 A1 Mar. 14, 2019

Related U.S. Application Data

(62) Division of application No. 15/296,697, filed on Oct. 18, 2016.
(Continued)

(51) Int. Cl.
*B29C 65/00* (2006.01)
*B29C 65/10* (2006.01)
(Continued)

(52) U.S. Cl.
CPC ........ *B29C 66/8652* (2013.01); *B29C 65/103* (2013.01); *B29C 65/18* (2013.01); *B29C 66/1122* (2013.01); *B29C 66/435* (2013.01); *B29C 66/73921* (2013.01); *B29C 66/8181* (2013.01); *B29C 66/8248* (2013.01);
(Continued)

(58) Field of Classification Search
CPC ............ B29C 66/1122; B29C 66/8652; B29C 66/86521; E04D 15/04; E04D 5/149; Y10T 156/1788
See application file for complete search history.

(56) References Cited

U.S. PATENT DOCUMENTS 3,256,681 A 6/1966 Phelps
4,380,696 A 4/1983 Masaki
(Continued)

FOREIGN PATENT DOCUMENTS

CA 1282268 4/1991
CH 677898 A5 * 7/1991 ........... B29C 65/103
(Continued)

*Primary Examiner* — Carson Gross
(74) *Attorney, Agent, or Firm* — Sand, Sebolt & Wernow Co., LPA

(57) ABSTRACT

A machine for welding an overlapped region of two adjacent strips of material and a method of using the same. The machine includes a housing with front and rear ends, a wheel train engaged with the housing for moving the housing across the material; a nozzle on the housing having a welding head at a free end; the nozzle being positionable at least partially beneath the housing's bottom wall for welding the overlapped region; front and rear pressure rollers engaged with the housing, where the front roller is positioned forwardly of the welding head and the rear roller is positioned rearwardly of the welding head; wherein the rear pressure roller applies pressure to the overlapped region when the wheel train moves the housing in a forward direction; and the front pressure roller applies pressure to the overlapped region when the wheel train moves the housing in a reverse direction.

9 Claims, 21 Drawing Sheets

Related U.S. Application Data

(60) Provisional application No. 62/244,311, filed on Oct. 21, 2015.

(51) Int. Cl.
*E04D 15/04* (2006.01)
*B29C 65/18* (2006.01)
*E04D 5/14* (2006.01)
*B29L 31/10* (2006.01)

(52) U.S. Cl.
CPC ...... *B29C 66/8282* (2013.01); *B29C 66/8362* (2013.01); *E04D 15/04* (2013.01); *B29C 66/83421* (2013.01); *B29C 66/86521* (2013.01); *B29C 66/876* (2013.01); *B29C 66/919* (2013.01); *B29C 66/929* (2013.01); *B29C 66/9672* (2013.01); *B29L 2031/108* (2013.01); *E04D 5/149* (2013.01)

(56) References Cited

U.S. PATENT DOCUMENTS

| | | | |
|---|---|---|---|
| 4,392,604 A | 7/1983 | Sears | |
| 4,504,352 A | 3/1985 | Meyer | |
| 4,855,004 A | 8/1989 | Chitjian | |
| 5,569,352 A | 10/1996 | Johansen et al. | |
| 5,624,511 A | 4/1997 | Lippman | |
| 6,155,117 A | 12/2000 | Stevens et al. | |
| 6,537,402 B2 | 3/2003 | Pate et al. | |
| 6,610,159 B2 | 8/2003 | Henegar | |
| 7,305,177 B2 | 12/2007 | Rantzen | |
| 2004/0010342 A1 | 1/2004 | Thelen | |
| 2005/0183831 A1 | 8/2005 | Schwetz | |
| 2006/0191993 A1 | 8/2006 | Markham et al. | |
| 2006/0193609 A1 | 8/2006 | Rantzen | |
| 2007/0050157 A1 | 3/2007 | Kahn et al. | |
| 2007/0217892 A1 | 9/2007 | Newell | |
| 2008/0066870 A1 | 3/2008 | Gisler et al. | |
| 2008/0066871 A1* | 3/2008 | Gisler | B29C 66/1122 156/497 |
| 2008/0109998 A1 | 5/2008 | Graff | |
| 2008/0121333 A1 | 5/2008 | Dugan | |
| 2009/0192380 A1 | 7/2009 | Shariati et al. | |
| 2010/0139871 A1 | 6/2010 | Rasmussen et al. | |
| 2012/0267052 A1 | 10/2012 | Burgess et al. | |
| 2014/0044477 A1 | 2/2014 | Stanley | |
| 2014/0038143 A1 | 5/2014 | Daniel et al. | |
| 2014/0124125 A1 | 5/2014 | Nussbaum et al. | |
| 2014/0134580 A1 | 5/2014 | Becker | |
| 2014/0316614 A1 | 10/2014 | Newman | |

FOREIGN PATENT DOCUMENTS

| | | |
|---|---|---|
| CN | 104002023 | 8/2014 |
| EP | 0559610 | 10/1995 |
| KR | 20090003747 | 1/2009 |
| WO | 2014039586 | 3/2014 |

* cited by examiner

METHOD AND APPARATUS FOR WELDING A ROOFING MEMBRANE

CROSS REFERENCE TO RELATED APPLICATIONS

This is a Divisional Application of U.S. patent application Ser. No. 15/296,697, filed Oct. 18, 2016, which claims the benefit of U.S. Provisional Patent Application Ser. No. 62/244,311, filed Oct. 21, 2015. Each of the above applications are incorporated herein by reference.

TECHNICAL FIELD

This invention relates generally to welding equipment. More particularly, this invention is directed to a welding machine useful for welding roofing membranes and other flexible fabrics. Specifically, this invention is directed to a welding machine and a method of welding flexible fabrics where the machine is operable in forward and reverse directions.

BACKGROUND

Background Information

Large commercial buildings frequently have some type of flexible, waterproof roofing membrane installed on their roofs. The roofing membrane is provided in elongate strips that are arranged side-by-side across the surface of the roof. The edges of adjacent strips are overlapped with each other and are subsequently secured together to provide a waterproof surface over the roof. There are a number of ways of securing the overlapped edges of the strips together, one of which is heat welding them to each other.

A variety of welding machines have been developed for this purpose. These machines include a nozzle with a welding head that is positionable between the overlapped edges of the strips of roofing membrane and the welding head is used to apply heat to the overlapped region. One or more rollers for applying pressure to the heated overlapped region are also provided on the machine. The rollers are positioned on one side of the welding head and in such a way that they will substantially immediately contact the heated overlapped region and apply pressure thereto. The combination of heat and pressure bonds the overlapped region of two adjacent strips of roofing membrane together.

The nozzle on some of these prior art machines may be mounted on an arm that extends laterally outwardly from one side of the machine. The nozzle is slidable along the arm and is able to be moved away from the side of the machine when welding is not occurring and toward the side of the machine when getting ready to weld. The nozzle is mounted on the arm in such a way that it is able to pivot about and axis extending along the arm. The nozzle may be pivoted downwardly toward the roofing surface or upwardly away from the roofing surface. When the machine is being readied to weld, the nozzle is first pivoted downwardly toward the roofing surface and is then slid along the arm toward the side of the machine. Because of the orientation of the welding head on the nozzle, when the nozzle is slid toward the machine, the welding head moves at least partially under the bottom wall of the machine. In this position the welding head is able to be placed between the overlapped edge of one strip of roofing membrane and the underlapped edge of the other strip of roofing membrane. Welding can then commence. When welding of the overlapped region is completed, the operator slides the nozzle laterally away from the side of the machine and then pivots the nozzle upwardly about an axis extending along the arm, thus moving the hot welding head away from the roofing surface.

It should be noted that power is provided to the welding machine via cables that connect to a generator. The generator typically is lifted onto the roof for this purpose and this operation may require the use of a crane because of the weight of such generators. Additionally, the cables required to connect the generator and welding machine together may be long and have to be kept clear of the part of the roofing membrane that is being welded. Frequently, roofing company will have to have a person dedicated to watching and moving the cable on the roof so that this task does not interfere with the operation of the welding machine.

During welding operations, several strips of roofing membrane may need to be placed side-by-side to cover the roof surface. There may therefore be a number of individual overlapped regions that have to be welded in order to create the waterproof covering. These overlapped regions will tend to be spaced laterally from each other and generally parallel to each other. Additionally, each overlapped region tends to extend from proximate a first end of the roof to proximate a second end thereof. An operator will position the welding machine at a beginning of a first overlapped region at the first end of the roof and will weld that first overlapped region using the machine, ending at the second end of the roof. The machine then has to then be moved laterally over to the second overlapped region. Because of the presence of the cable and the configuration of the welding machine itself, it is necessary to move the welding machine from the second end of the roof back to the first end thereof and then move the welding machine laterally across to the beginning of the second overlapped region. It has been found with prior art machines that turning the machine around at the second end of the roof so as to face the other way and then moving the machine laterally across to the second overlapped region simply does not work. This is because the nozzle and welding head will then be positioned to face in the wrong direction to be able to enter between the overlapped and underlapped edges of the second overlapped region. Additionally, if the machine is rotated through 180°, it is very likely that the cable will then extend across the second overlapped region and therefore be in the welding path of the machine. If this is not the case then the cable may have to be draped over the top of the hot machine or be positioned rearwardly thereof and thereby be constantly in the way of the operator. For these reasons alone, welding with the machine in this rotated orientation is not possible. Operators therefore have to drag the welding machine back to the first end of the roof in its original un-rotated orientation and then shift it laterally across the roof. Welding of several strips of roofing membrane always takes place in the same single direction; namely, from the first end of the roof to the second end of the roof. No welding takes place from the second end of the roof to the first end unless the orientation of the overlap of the adjacent strips of roofing membrane is changed to accommodate the orientation of the welding head on the machine. In reality, alternating the overlapping just simply won't occur as it is far too time consuming for a company to undertake. It is quickly and easier to drag the machine back to the first end after completing each welding run.

SUMMARY

The Applicant has recognized that it would be advantageous to be able to weld a series of roofing membrane strips in two directions instead of only in one direction. The machine disclosed herein makes it possible to accomplish welding in two directions, i.e., from the first end of the roof to the second end on the first overlapping region and from the second end to the first end on the second overlapping region. This ability to weld in two opposite directions reduces the overall time involved to weld several strips of roofing membrane together and therefore reduces the cost involved. Additionally, the ability to weld in two directions also tends to reduce operator fatigue as it is not necessary to drag the machine back to the first end of the roof after each welding run. So, the machine disclosed herein also tends to improve working conditions for the roofers themselves. The machine includes a handle that is pivotable from one side of the machine to the other and this pivotable handle enables the machine itself to be oriented in a single direction whether welding in a first direction or welding in a second direction. The handle is therefore the component that enables the machine to weld in two opposite directions. When the machine is to be moved from one seam to another seam, the welding nozzle is pivoted from a first position to a second position. In the first position, the nozzle is located proximate the material to be welded and in the second position the nozzle is located a distance away from the material to be welded.

The pivotable handle allows an operator to walk forwards or backwards during movement of the machine across a material to be welded. Previously known machines have typically only been operable in such a way that the operator has to move backwards across the material to be welded. The operator may therefore orient his or her body so that they face forwardly or backwardly relative to the direction in which they move the housing across a material to be welded using the machine.

A machine for welding an overlapped region of two adjacent strips of material and a method of using the same. The machine includes a housing with front and rear ends, a wheel train engaged with the housing for moving the housing across the material; a nozzle on the housing having a welding head at a free end; the nozzle being positionable at least partially beneath the housing's bottom wall for welding the overlapped region; front and rear pressure rollers engaged with the housing, where the front roller is positioned forwardly of the welding head and the rear roller is positioned rearwardly of the welding head; wherein the rear pressure roller applies pressure to the overlapped region when the wheel train moves the housing in a forward direction; and the front pressure roller applies pressure to the overlapped region when the wheel train moves the housing in a reverse direction.

In one aspect, the invention may provide a machine for welding an overlapped region of two adjacent strips of a material, said welding machine comprising a housing having a front end and a rear end, and having a longitudinal axis extending between the front and rear ends; a wheel train engaged with the housing and adapted to move the housing across the material to be welded; a nozzle engaged with the housing and having a welding head at a free end thereof; and wherein the welding head is positionable at least partially beneath a bottom wall of the housing during a welding operation; a front pressure roller engaged with the housing and positioned forwardly of the welding head; and a rear pressure roller engaged with the housing and positioned rearwardly of the welding head; wherein the rear pressure roller is adapted to apply pressure to the overlapped region when the wheel train moves the housing in a forward direction parallel to the longitudinal axis; and the front pressure roller is adapted to apply pressure to the overlapped region when the wheel train moves the housing in a reverse direction parallel to the longitudinal axis.

In another aspect, the invention may provide a method of heat welding a series of overlapped regions of adjacent strips of flexible material that extend from a first end of a structure to a second end of the structure; said method comprising the steps of providing a heat welding machine comprising: a housing with front and rear ends and with a longitudinal axis extending therebetween; a wheel train engaged with the housing; a nozzle engaged with the housing and having a welding head at a free end thereof; a front pressure roller engaged with the housing and positioned forwardly of the welding head; and a rear pressure roller engaged with the housing and positioned rearwardly of the welding head; positioning the welding machine at the first end of the structure and adjacent a first end of a first overlapped region; inserting the welding head between an overlap layer and an underlap layer of the first overlapped region; heating the welding head, moving the housing via the wheel train in a forward direction along the first overlapped region and toward the second end of the structure; applying heat from the welding head to the first overlapped region as the housing moves in the forward direction; applying pressure to the heated first overlapped region as the housing moves in the forward direction; applying pressure to the heated first overlapped region as the housing moves in the forward direction; welding the first overlapped region; reaching the second end of the structure and a second end of the first overlapped region; moving the welding machine laterally from the second end of the first overlapped region to a first end of a second overlapped region, where the first end of the second overlapped region is located at the second end of the structure; engaging the welding head in the second overlapped region; moving the welding machine from the second end of the structure toward the first end of the structure in a reverse direction; applying heat from the welding head to the second overlapped region as the housing moves in the reverse direction; applying pressure to the heated second overlapped region as the housing moves in the reverse direction; welding the second overlapped region with the welding head while moving in the reverse direction; and reaching the first end of the structure and a second end of the second overlapped region.

BRIEF DESCRIPTION OF THE SEVERAL VIEWS OF THE DRAWINGS

A sample embodiment of the disclosure is set forth in the following description, is shown in the drawings and is particularly and distinctly pointed out and set forth in the appended claims. The accompanying drawings, which are fully incorporated herein and constitute a part of the specification, illustrate various examples, methods, and other example embodiments of various aspects of the disclosure. It will be appreciated that the illustrated element boundaries (e.g., boxes, groups of boxes, or other shapes) in the figures represent one example of the boundaries. One of ordinary skill in the art will appreciate that in some examples one element may be designed as multiple elements or that multiple elements may be designed as one element. In some examples, an element shown as an internal component of another element may be implemented as an external component and vice versa. Furthermore, elements may not be drawn to scale.

Similar numbers refer to similar parts throughout the drawings.

DETAILED DESCRIPTION

Figure 1:
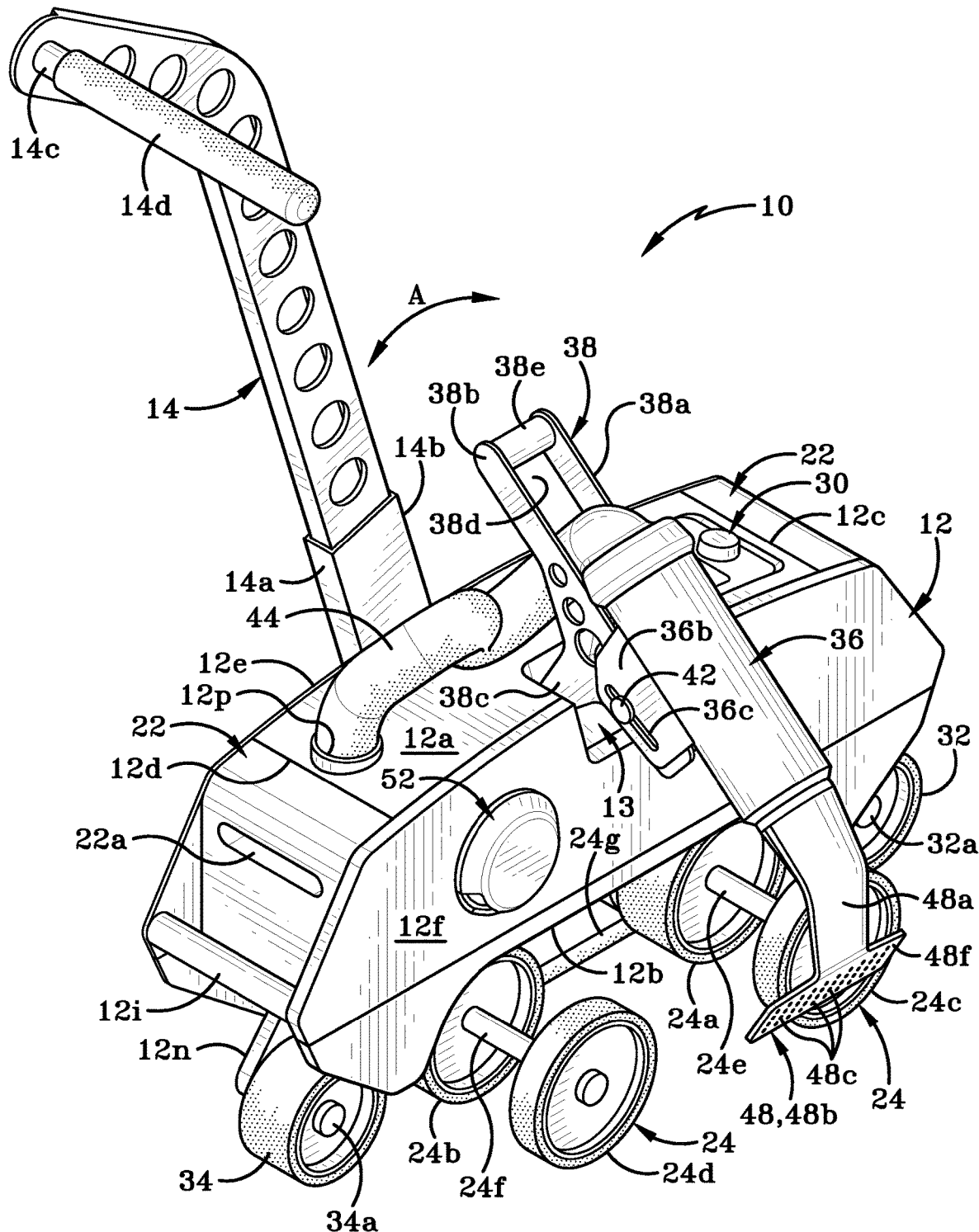
FIG. 1 is a rear perspective view of a welding machine for roofing membranes.
Figure 2:
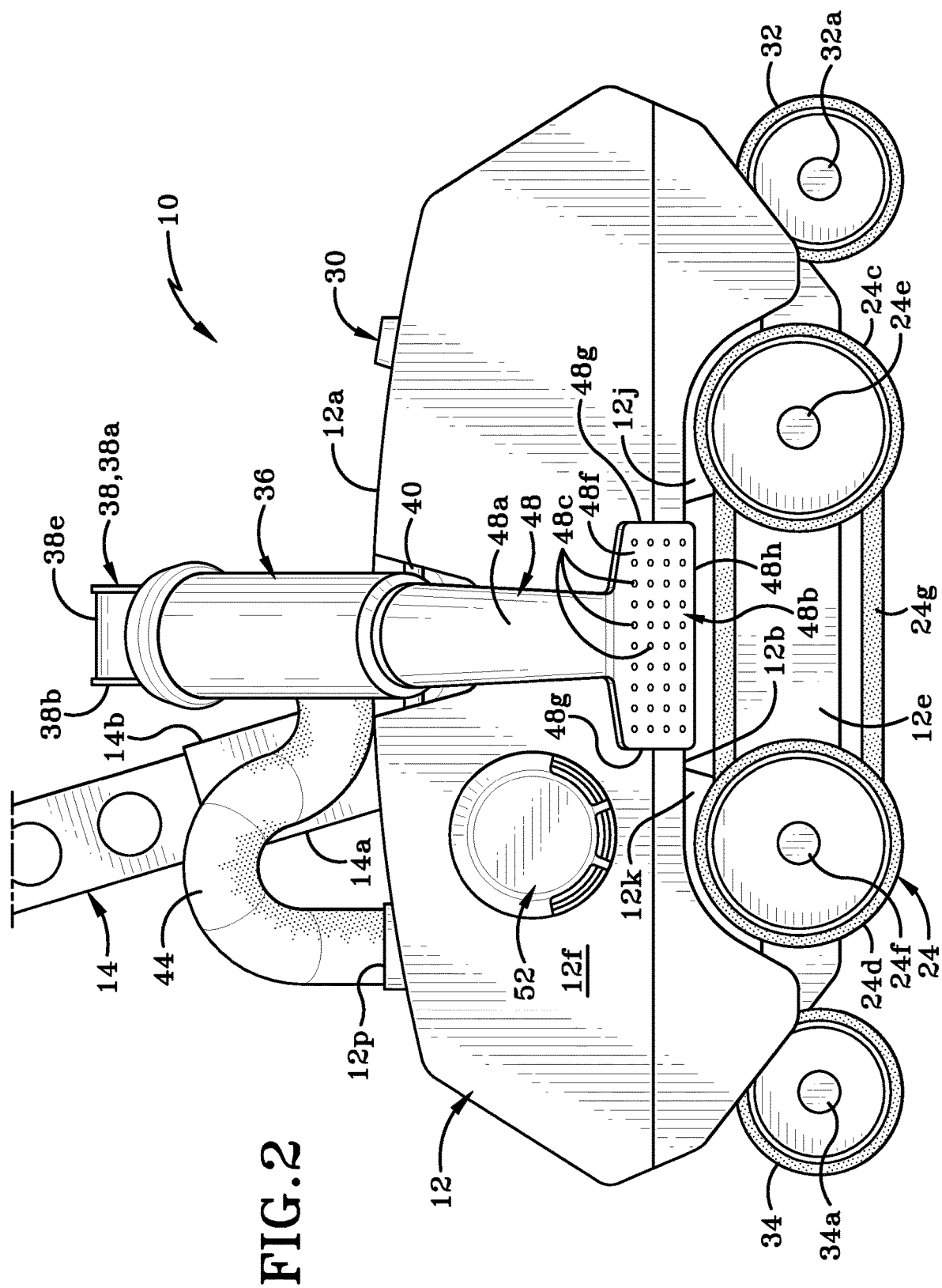
FIG. 2 is a right side view thereof.

Referring to FIGS. 1-7, there is shown a welding machine in accordance with an aspect of the present invention, generally indicated at 10. Welding machine 10 includes a housing 12 that includes a top wall 12a FIG. 5), a bottom wall 12b, a front wall 12c, a rear wall 12d, a left side wall 12e (FIG. 4), and a right side wall 12f. Housing 12 has a longitudinal axis "Y" (FIG. 4) that extends between front wall 12c and rear wall 12d. The walls 12a-12f bound and define an interior chamber 12g (FIG. 7) within which a plurality of components are housed. These components will be discussed in greater detail later herein.

Figure 4:
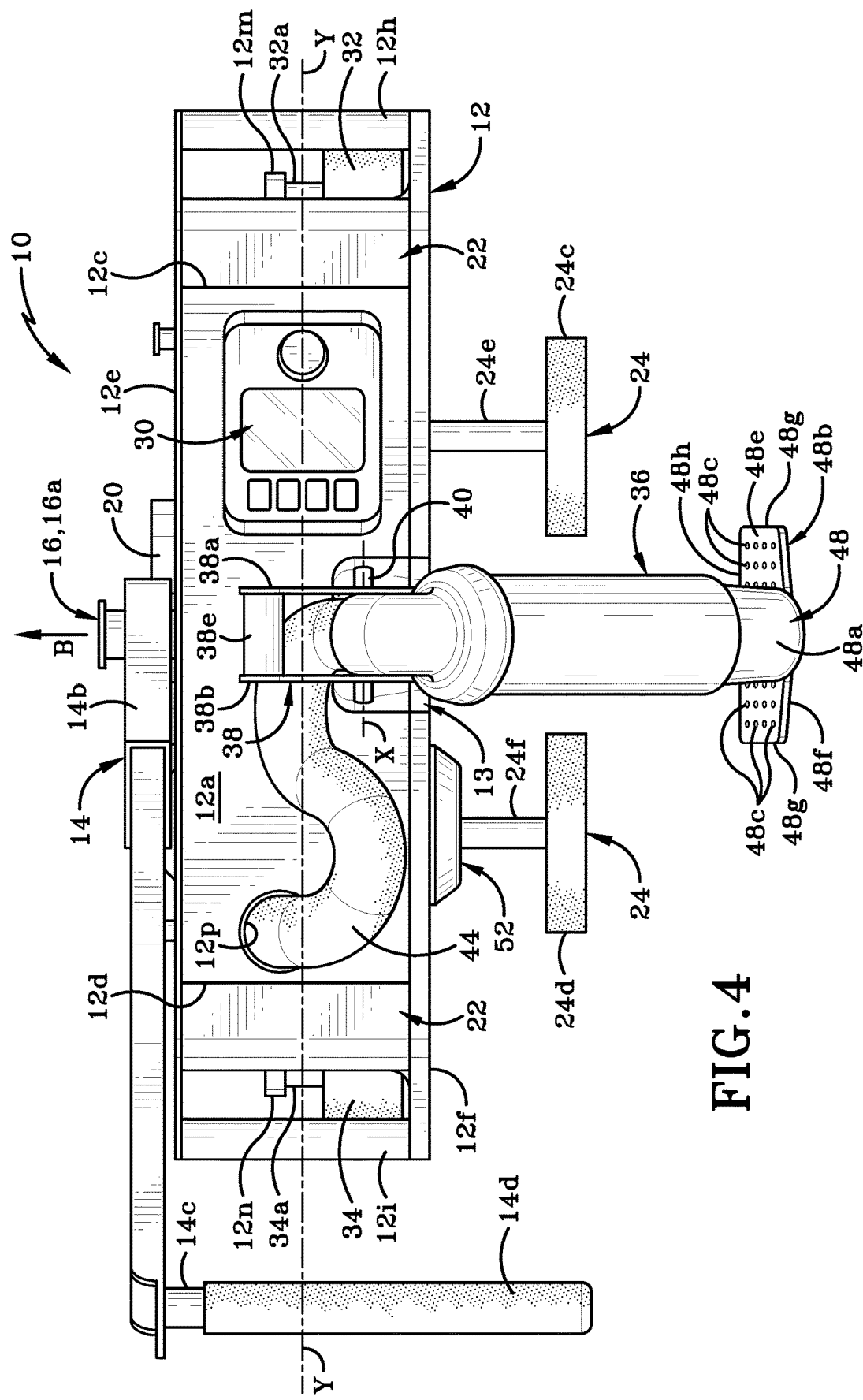
FIG. 4 is a top view of the welding machine.
Figure 7:
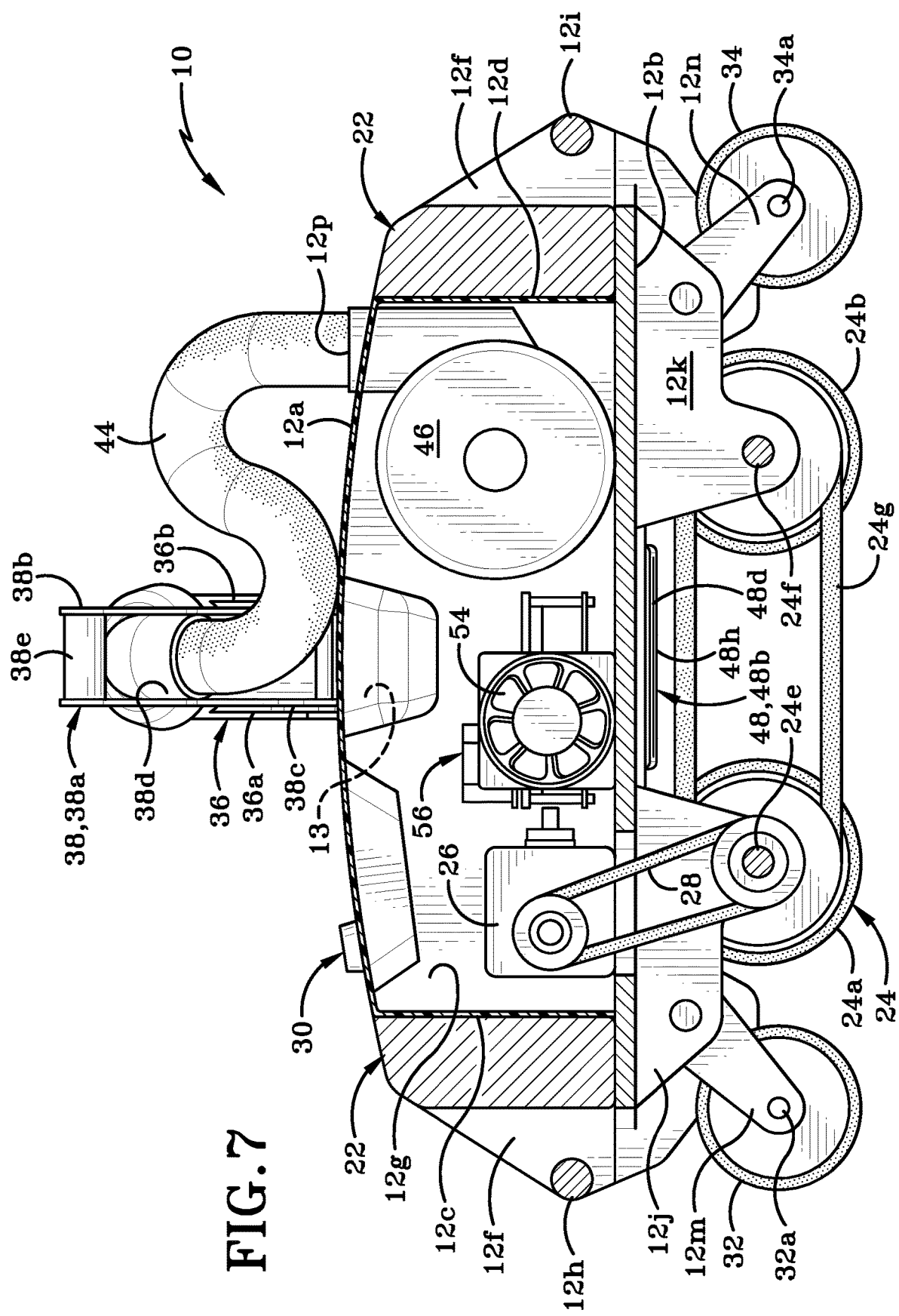
FIG. 7 is a longitudinal cross-section of the welding machine taken along line 7-7 of FIG. 4.

As can be seen in FIGS. 4 and 7, a portion of each of the left and right side walls 12e, 12f and bottom wall 12b extends beyond front wall 12c and a portion of each of the left and right side walls 12e, 12f and bottom wall 12b extends beyond rear wall 12d. A first gripper bar 12h extends between front ends of the portions of the left and right side walls 12e, 12f. A second gripper bar 12i extends between rear ends of the portions of the left and right side walls 12e, 12f. First and second gripper bars 12h, 12i are provided to help and operator lift and maneuver housing 12.

Figure 3:
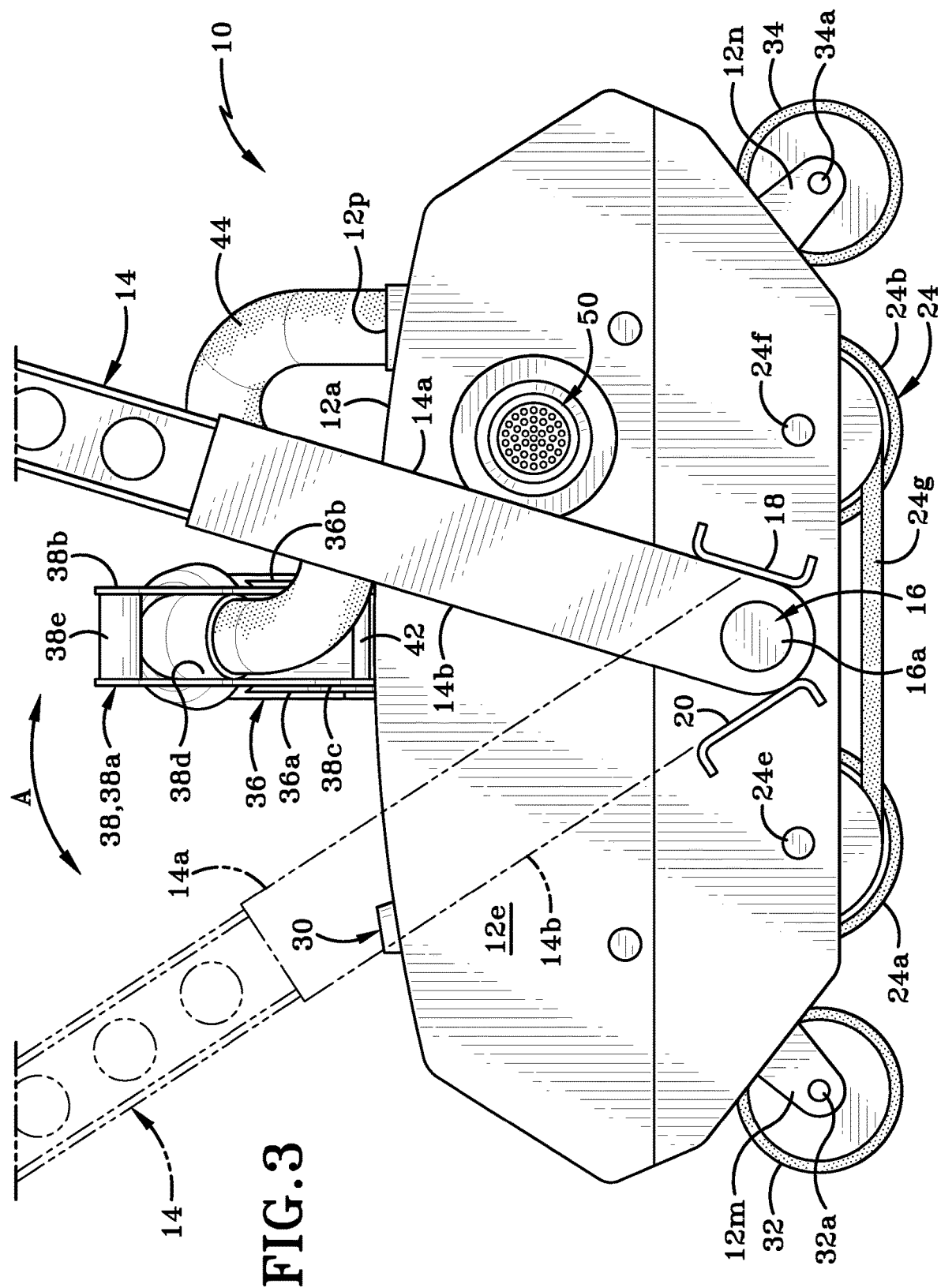
FIG. 3 is a left side view thereof and showing the handle of the machine in a first position and, in phantom, in a second position.

A handle 14 is mounted onto left side wall 12e of housing 12 by way of a pivot rod 16 (FIG. 3). Handle 14 has a first side surface 14a and an opposed second side surface 14b. Handle 14 further includes a handle bar 14c with a grip 14d applied thereto and which is grasped by the operator during operation of welding machine 10. A first flange 18 and a second flange 20 extend outwardly from left sidewall 12e in a region adjacent pivot rod 16. First and second flanges 18, 20 are provided to limit the extent to which handle 14 may be pivoted about an axis that extend along pivot rod 16. The axis in question is oriented at right angles to left sidewall 12e and at right angles to longitudinal axis "Y". Handle 14 is movable between a first position and a second position. The first position of handle 14 is illustrated in FIG. 1 and is also illustrated in FIG. 3 where the handle 14 is drawn in solid lines. In this first position handle 14 angles rearwardly toward rear wall 12d of housing 12. In the second position, handle 14 angles forwardly toward front wall 12c of housing 12. This second position is illustrated in dashed lines in FIG. 3. Handle 14 is selectively movable between the first and second positions as indicated by arrow "A" in FIG. 3. When handle 14 is in the first position, a first sidewall 14a of handle 14 rests against first flange 18. When handle 14 is in the second position, a second sidewall 14b of handle 14 rests against second flange 20. Pivot rod 16 may be of a type that includes a rod that secures handle 14 to housing 12 and includes some type of locking mechanism to secure handle 14 in place. For instance, pivot rod may include some type of spring-loaded locking mechanism that is disengaged to move handle 14 between the first and second positions and is then re-engaged when handle 14 is in the new position. The spring loaded locking mechanism could be disengaged by pulling the head 16a (FIG. 4) of pivot rod 16 outwardly in a direction indicated by arrow "B" and then, after the handle has been pushed or pulled in the desired direction, head 16a could be released to return to its original position and thereby become re-engaged. It will be understood that any other type of locking mechanism may be utilized in conjunction with handle 14 to releasably secure handle 14 in each of the selected first and second positions.

One or more weights 22 are selectively engageable with housing 12. Weight 22 is positioned adjacent one of front and rear walls 12c, 12d and rests on the portion of bottom wall 12b that extends outwardly beyond front and rear walls 12c, 12d. This can be seen in FIG. 7. Weight 22 may be secured in some manner to the adjacent front or rear wall 12c, 12d or to bottom wall 12b. Each of the one or more weights 22 may be of a different weight. For example, weight 22 may be anywhere from 2 lbs to 25 lbs in weight. The one or more weights 22 may be selectively engaged with housing 12 to change the overall weight of welding machine 10. Welding of materials such as roofing membranes typically requires the application of both heat and pressure. Adding one or more weights 22 to housing 12 changes the pressure that may be applied to roofing membranes by welding machine 10. As illustrated in FIG. 1, each weight 22 may define a slot 22a in an end wall thereof. Slot 22a may be used as a hand-hold for holding and manipulating weight 22.

Figure 9:
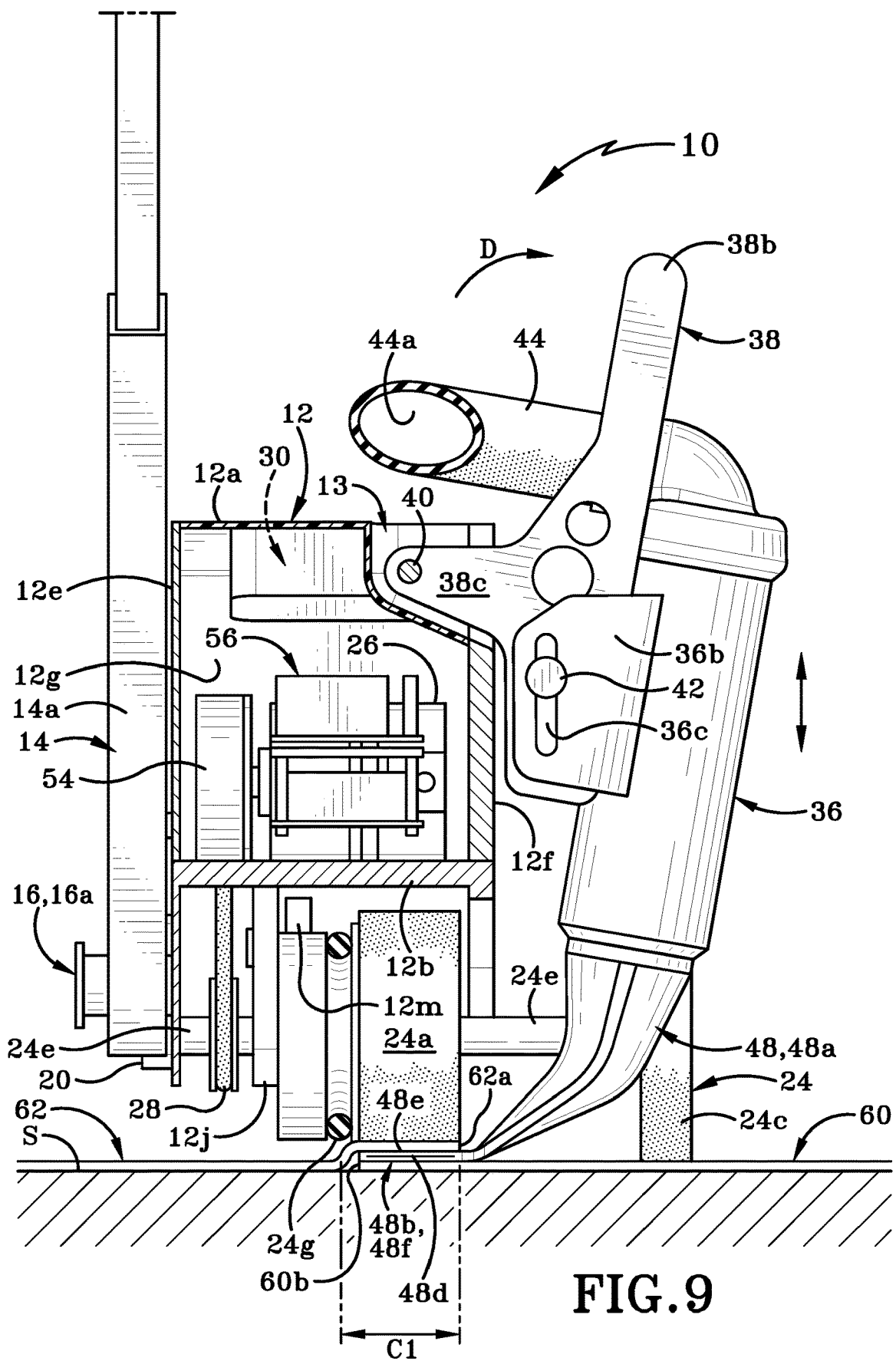
FIG. 9 is a lateral cross-section of the welding machine taken along line 9-9 of FIG. 8, and showing the nozzle in the first position and ready to begin welding.

Welding machine 10 further includes a weld train 24 that is used to move welding machine 10 over a surface "S" (FIG. 9). Weld train 24 as illustrated includes a front wheel 24a, a rear wheel 24b, a front follower wheel 24c and a rear follower wheel 24d. Front wheel 24a and front follower wheel 24c are connected together by a first shaft 24e. Rear wheel 24b and rear follower wheel 24d are connected together by a second shaft 24f. First and second shafts 24e, 24f also extend through apertures defined in first and second mounting plates 12j, 12k (FIG. 7) that extend downwardly from bottom wall 12b of housing 12. Wheels 24a-24d are thereby engaged with housing 12. A drive belt 24g is received in a groove defined in each of front and rear wheels 24a, 24b. This groove can be seen in FIGS. 5 and 9. Belt 24g is an air dam belt that traps hot air from the welding nozzle 36 in the area of the membranes that are to be welded together. This air dam belt 24g aids in creating a "clean" weld with an easily identifiable line of welded material. Drive belt 24g also ensures that front wheel 24a and rear wheel 24b rotate in unison and therefore also ensures that front follower wheel 24c, and rear follower wheel 24d rotate in unison with front and rear wheels 24a, 24b. Wheels 24a-24d are operatively engaged with a stepper motor 26 (FIG. 7) via a drive belt 28. Drive belt 28 engages first drive shaft 24e and rotates same, thereby rotating front wheel 24a and front follower wheel 24c. The rotation of front wheel 24a causes rotation in drive belt 24g and drive belt 24g, in turn, causes rotation of rear wheel 24b and rear follower wheel 24d.

Although not illustrated herein, it will be understood that wiring is provided within welding machine 10 and this wiring connects stepper motor 26 to a control panel 30 provided on top wall 12a of housing 12. The operator will activated and deactivate stepper motor 26 by engaging appropriate controls on control panel 30. Stepper motor 26 may be activated in such a way that current may flow therethrough in a first direction or in a second direction. The specific direction is selected via controls on control panel 30. If current is caused to flow in the first direction through motor 26, then welding machine 10 will be caused to move in a forward direction (i.e., with front wheel 32 leading the way). If current is caused to flow in the second direction through motor 26, then welding machine 10 will be caused to move in a reverse direction (i.e., with rear wheel 34 leading the way). Movement of welding machine 10 in either of the forward or reverse directions is preceded by the operator engaging the appropriate control on control panel 30.

Welding machine 10 is also provided with a front roller 32 and a rear roller 34. Front roller 32 is mounted on a first mounting bracket 12m that extends downwardly and forwardly from first mounting plate 12j. Front roller 32 is positioned forwardly of front wheel 24a and generally below a weight 22 engaged with front wall 12c of housing 12. Front roller is mounted for rotation about an axle 32a that is oriented generally parallel to drive shaft 24e.

Rear roller 34 is mounted on a second mounting bracket 12n that extends downwardly and rearwardly from second mounting plate 12k. Rear roller 34 is mounted for rotation about an axle 34a that is oriented substantially parallel to drive shaft 24f. Rear roller 34 is located rearwardly of rear wheel 24b and generally below one of weights 22 that is positioned adjacent rear wall 12d of housing 12.

Front roller 32 and rear roller 34 are not driven components of welding machine 10 but, instead, simply rotate about their respective axles 32a, 34a as front and rear wheels 24a, 24b rotate and move welding machine 10 across surface "S".

Figure 11:
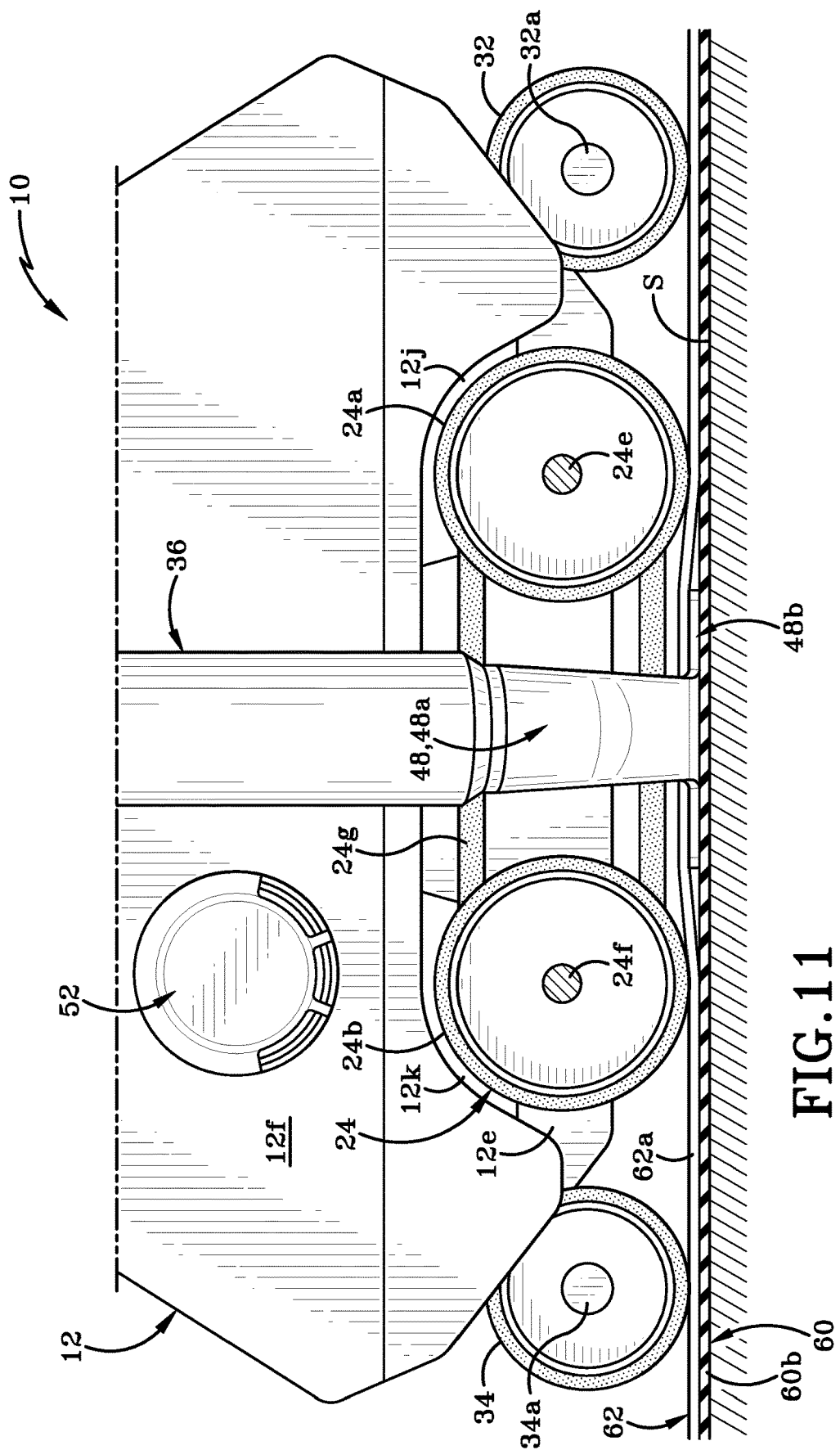
FIG. 11 is a partial right side view of the welding machine taken along line 11-11 of FIG. 10.

Welding machine 10 further includes a nozzle 36 that is mounted on a nozzle mounting bracket 38 which in turn is mounted into a notched region defined in the top wall 12a and right side wall 12f of housing 12. This is notched region is illustrated in FIGS. 1 and 9 and indicated by reference number 13. Mounting bracket 38 comprises a first mounting plate 38a and a second mounting plate 38b that are spaced a distance longitudinally apart. A flange 38c extends outwardly from each of the first and second mounting plates 38a, 38b. The first and second mounting plates 38a, 38b are positioned so that the flanges 38c extend into the notched region 13 on housing 12. A pivot rod 40 extends through aligned apertures defined in the two flanges 38c and into adjacent portions of the exterior wall of housing 12 that defines notch 13. Pivot rod 40 permits nozzle mounting bracket 38 to pivot between a first position shown in FIGS. 1, 2, 4, 6; and a second position shown in FIGS. 9 & 11. A gap 38d is defined between interior surfaces of first mounting plate 38a and second mounting plate 38b. A handle 38e extends between an uppermost end of first mounting plate 38a and an uppermost end of second mounting plate 38b. Handle 38e gives an operator a place to grip nozzle mounting bracket 38 so that they can move bracket 38 more easily between the first and second positions, as will be discussed later herein.

Nozzle 36 includes a pair of flanges 36a (FIG. 9) and 36b (FIG. 1) that are spaced apart from each other and are spaced so as to be positioned adjacent first and second mounting plates 38a, 38b, respectively. Each of the flanges 36a, 36b defines a slot 36c therein and through which a fastener 42 is selectively engaged. Fastener 42 extends through slot 36c and through an aligned slot or aperture in each of first and second mounting plates 38a, 38b. Fastener 42 thus secures nozzle 36 to nozzle mounting bracket 38 in an adjustable manner. Fastener 42 will freely move in slot 36c via a spring loaded mechanism. The arrangement allows nozzle 36 to be a 'floating nozzle", i.e., capable of moving slightly up and down. The "floating nozzle" 36 aids in solving any welding issues that arise as machine 10 travels over an uneven roof or over insulation materials that may be positioned underneath the roofing membrane that is being welded by machine 10.

A first end of a hose 44 is engaged with a first end of nozzle 36 and extends through gap 38d defined between first and second mounting plates 38a, 38b. Hose 44 extends through an aperture 12p (FIG. 1) in top wall 12a of housing 12 and connects to a blower motor assembly 46 (FIG. 7). Assembly 46 is operatively engaged with control panel 30 and is activated and deactivated thereby. Blower motor assembly 46 is activated by engaging a control on control panel 30. Blower motor assembly 46 is provided to heat air which then flows through hose 44, through nozzle 36 and into a welding head 48 provided at a second end of nozzle 36. Air vents 50, 52 for blower motor assembly 46 are provided on first and second side walls 12e, 12f of housing 12.

Welding head 48 comprises a generally T-shaped member that includes a shaft 48a and a welding plate 48b. Shaft 48a is engaged with a second end of nozzle 36. Welding plate 48b has an upper surface 48e and a lower surface 48f. One or both of the upper surface 48e and lower surface 48f defines a plurality of apertures 48c (FIG. 6) therein. Welding plate 48b also includes side edges 48g and an end 48h that extend between upper surface 48e and lower surface 48f. One or more openings 48d are defined in one or more of side edges 48g and end 48h. Each opening 48d may comprise an elongate slit that is formed in the associated side edges 48g and/or end 48h. Apertures 48c and openings 48d are in fluid communication with a bore of nozzle 36 and thereby with the bore 44a (FIG. 9) of hose 44. Apertures 48c and openings 48d enable heated air generated by blower assembly 46 to flow out of welding plate 48b and into the air surrounding an exterior of plate 48. When welding plate 48b is placed into an overlapped region of the roofing membrane or other material being welded the heated air flowing out of apertures 48c and openings 48d will heat up the material of the roofing membrane. The provision of openings 48d ensures that heated air flows in front of and behind welding plate 48b and therefore ensures that the material to be welded is adequately preheated when machine 10 is moved in the forward direction and in the rearward direction.

Welding machine 10 also includes a cooling assembly 54 (FIG. 7) that is operatively engaged with control panel 30. Cooling fan 54 is activated when welding with welding machine 10 is completed to lower the temperature of machine 10. Cooling fan 54 may also be automatically activated if the temperature in cavity 12g rises beyond a certain point. Welding machine 10 is also provided with a power source and controller 56 that are operatively engaged with control panel 30. The controller may be an AMD board or any type of central processing unit that includes programming for controlling welding machine 10. It will be understood that the power source may be a battery that is retained within chamber 12g of housing 12. The power source 56 may be operatively engaged with each of the components in welding machine that requires power to be provided thereto. Power source 56 may therefore be operatively engaged with one or both of stepper motor 26 and blower motor assembly 46. Alternatively, welding machine 10 may be operatively engaged with a remote generator via one or more cables (not shown).

Figure 8:
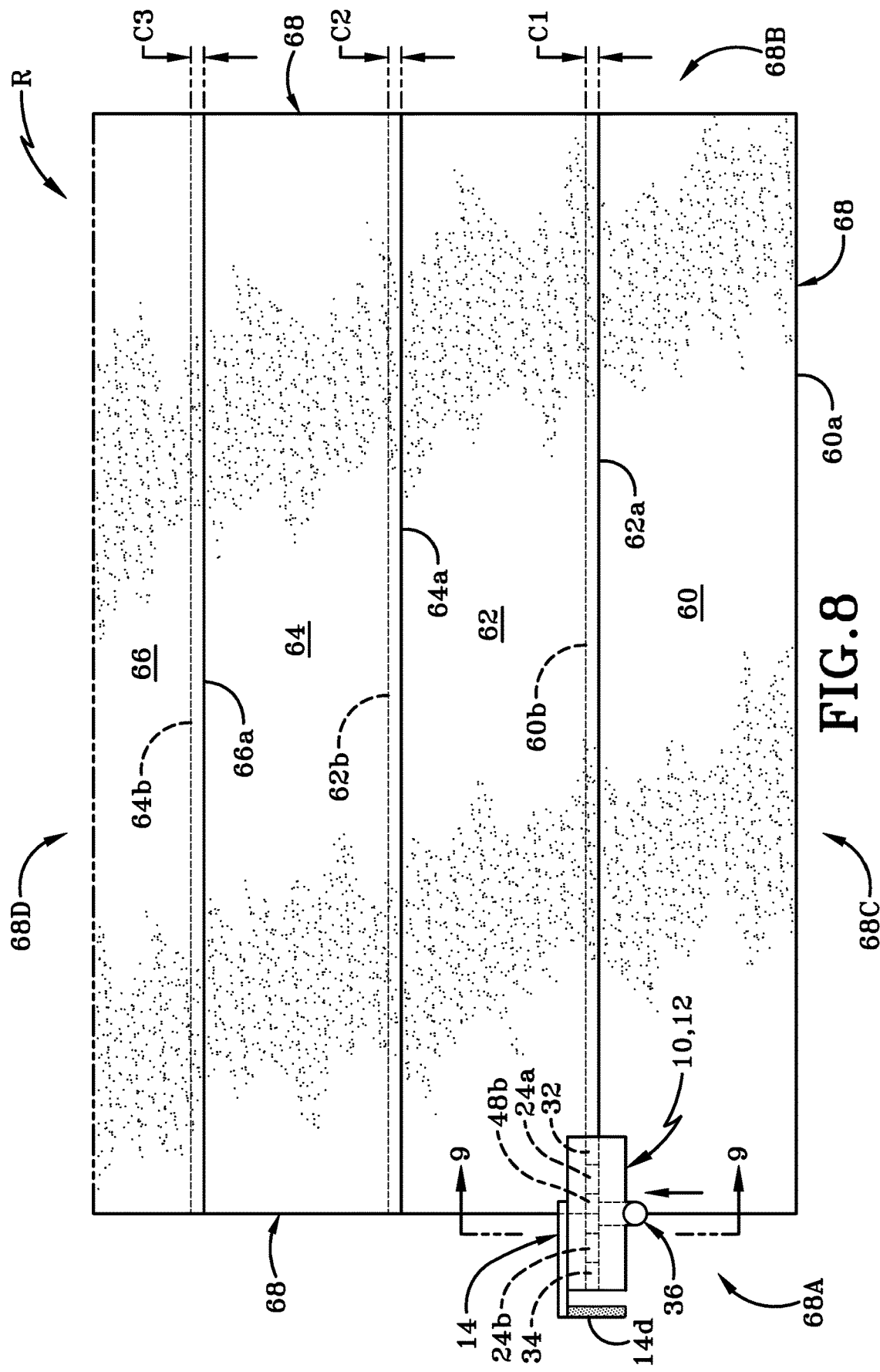
FIG. 8 is a top view of a roof of a building with a plurality of overlapped strips of roofing membrane laid out thereon and the welding machine of FIG. 1 positioned at a first end of a first pair of overlapped strips.

Referring now to FIG. 8, there is shown a plurality of roofing membrane strips 60, 62, 64, and 66 that have been laid over a roof. An exterior perimeter of the roof is indicated herein by the reference number 68 and the surface "S" illustrated in FIGS. 9, 11, 12, and 16 is the upper surface of the roof. The roofing membrane may be comprised of any suitable type of thermoplastic or other material that is able to be welded via application of heat and pressure. Strips 60-66 are arranged in a parallel side-by-side configuration. First strip 60 has a first edge region 60a and a second edge region 60b. Second strip 62 has a first edge region 62a and a second edge region 62b. Third strip 64 has a first edge region 64a and a second edge region 64b. Fourth strip 66 has a first edge region 66a and a second edge region that is not illustrated in the attached figures. First edge region 62a of second strip 62 overlaps second edge region 60b of first strip 60 to form a first overlapped region that is indicated by the reference character "C1" in FIG. 8. First edge region 64a of third strip 64 overlaps second edge region 62b of second strip 62 to form a second overlapped region "C2". First edge region 66b of fourth strip 66 overlaps second edge region 64b of third strip 60 to form a third overlapped region "C3".

Figure 12:
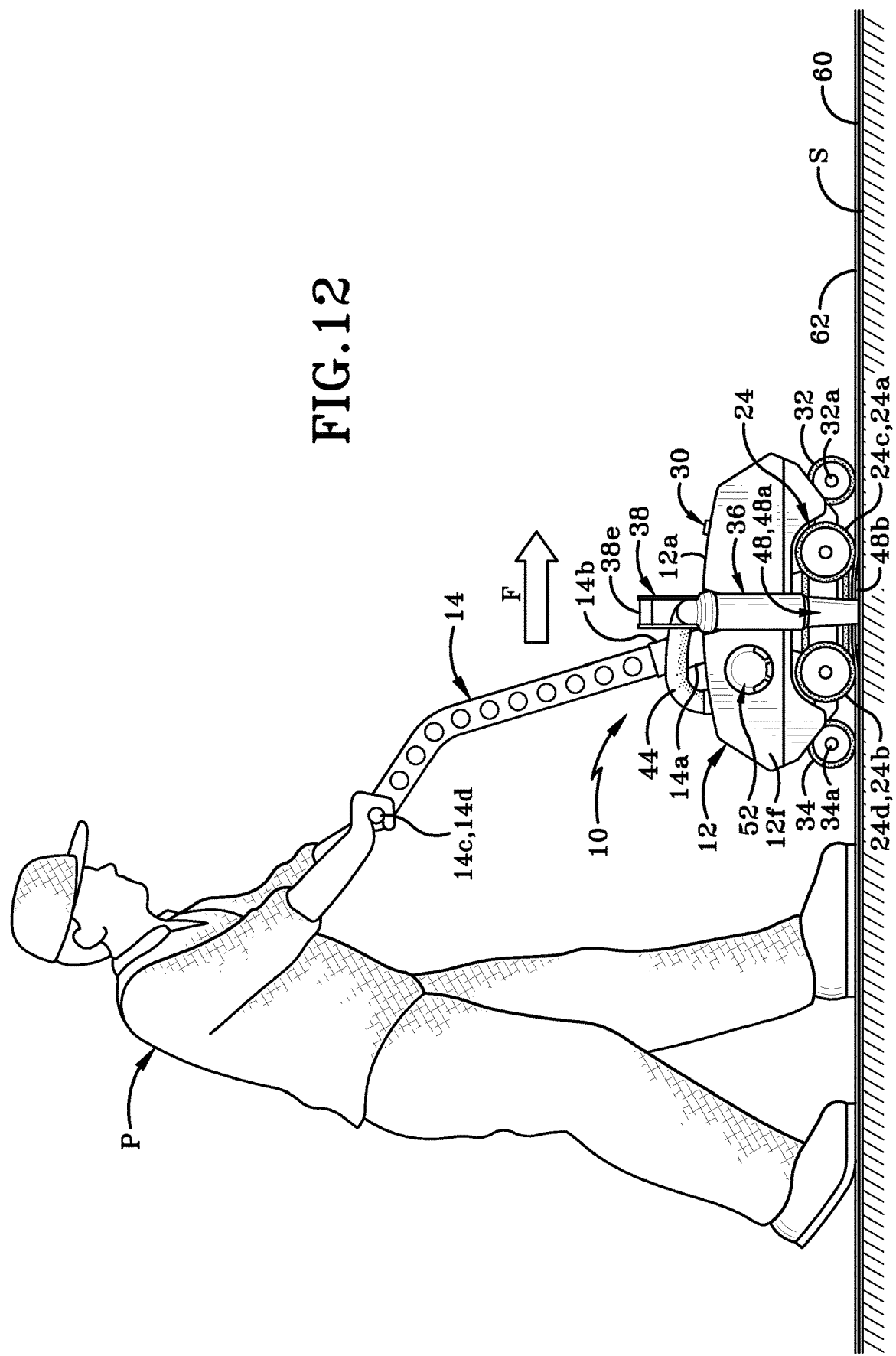
FIG. 12 shows a workman guiding the welding machine using the handle that is in a first position and moving in a first direction down the first pair of overlapped strips from FIG. 10.

FIG. 8 shows welding machine 10 positioned upon a roof "R" (or other surface) that has a first end 68A, a second end 68B, a first side 68C and a second side 68C. A plurality of strips of material are placed onto roof "R"; these strips are indicated in FIG. 8 as strips 60, 62, 64, 66 and edge regions thereof are overlapped with each other as will be described later herein. Welding machine 10 is positioned on the surface of this material and at a first end of the overlapped first and second strips 60, 62. The housing of welding machine 10 is placed in a first orientation relative to the first end 68A and second end 68B of the structure. As shown in FIG. 8, the housing is oriented generally at right angles to first end 68A and second end 68B. It should be noted that the front roller 32, front wheel 24a, rear wheel 24b, and rear roller 34 are all aligned with first overlapped region "C1". Additionally, handle 14 is set in the first position as is shown in FIG. 12 and when ready to weld an operator "P" (FIG. 12) will move to a position where they may stand rearwardly of rear roller 34. (In other instances, the operator "P" may stand in front of front roller 32. The operator "P" may decide to face second end 68B and walk forwardly toward second end 68B or may decide to face first end 68A and walk backwardly toward second end 68B.)

The operator will engage control panel 30 to set the appropriate parameters for welding first overlapped region "C1". These parameters may include the temperature to which the air supplied to welding plate 48b or welding plate 48b itself may be heated (a suitable temperature may be in the range of 500° C. for some thermoplastic roofing materials. The parameters may also include the speed at which the front and rear wheels 24a, 24b will be driven and thereby move welding machine 10 along the first overlapped region "C1". The operator will also determine what size weights should be utilized for welding and will engage the appropriate weights 22 on welding machine 10.

Figure 6:
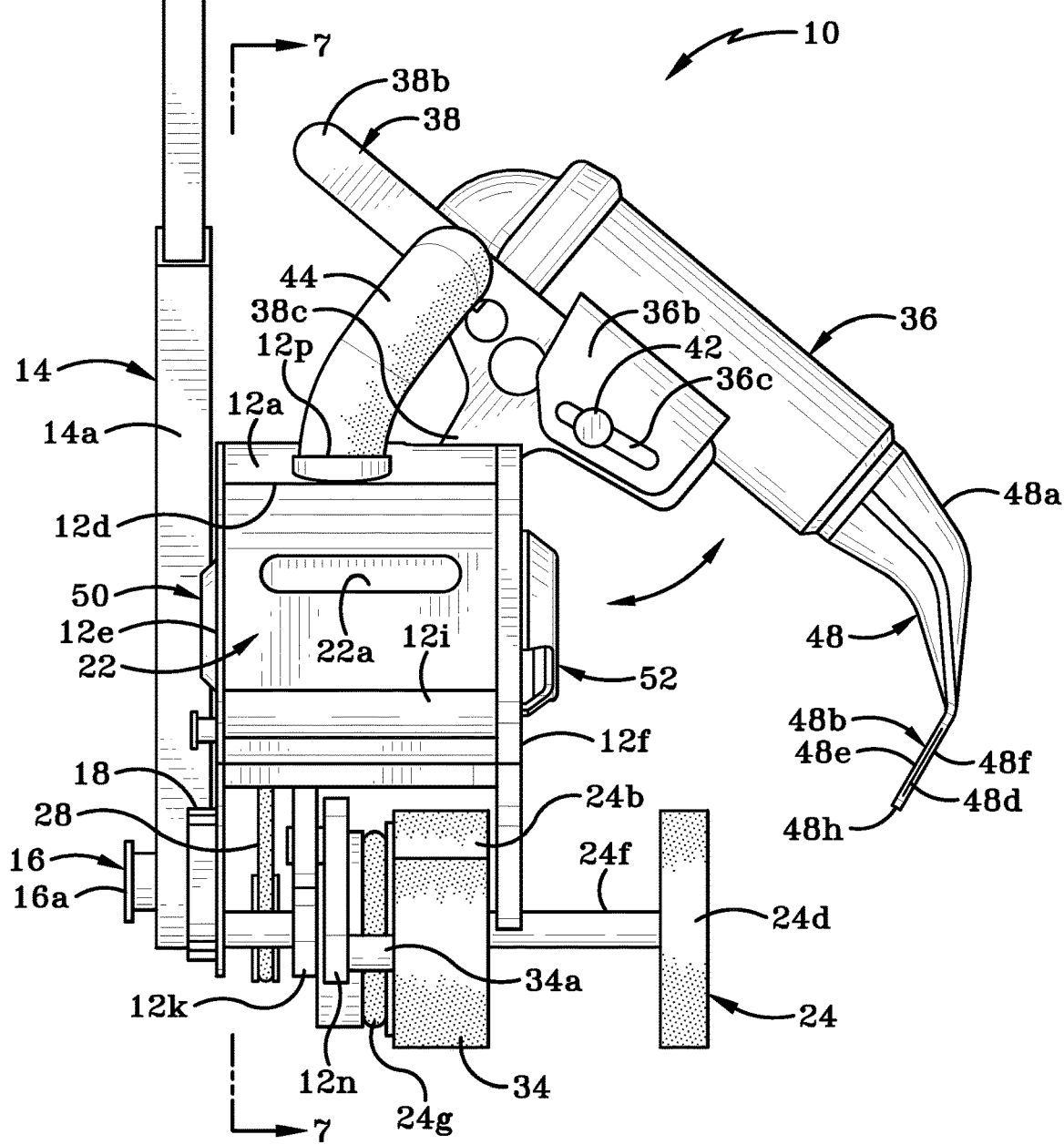
FIG. 6 is a rear view thereof.

Welding head 48 also has to be moved from the first position shown in FIG. 6 to the second position shown in FIG. 9 in order to bring welding plate 48b into engagement with first overlapped region "C1". This is accomplished by the operator grasping handle 38e and moving handle 38e in the direction indicated by arrow "D" in FIG. 9. This motion causes the second end of nozzle 36 and the welding head 48 engaged therewith to pivot about an axis "X" (FIG. 4) extending along pivot rod 40 and to move downwardly toward surface "S". This axis "X" is substantially parallel to longitudinal axis "Y" of welding machine 10. The pivotal motion about pivot causes plate 48b to move from where it is at angle relative to bottom wall 12b to an orientation where plate 48b is substantially parallel to bottom wall 12b and thereby to surface "S". The operator will ensure that welding plate 48b slides between a lower surface of second strip 62 and an upper surface of first strip 60.

Figure 10:
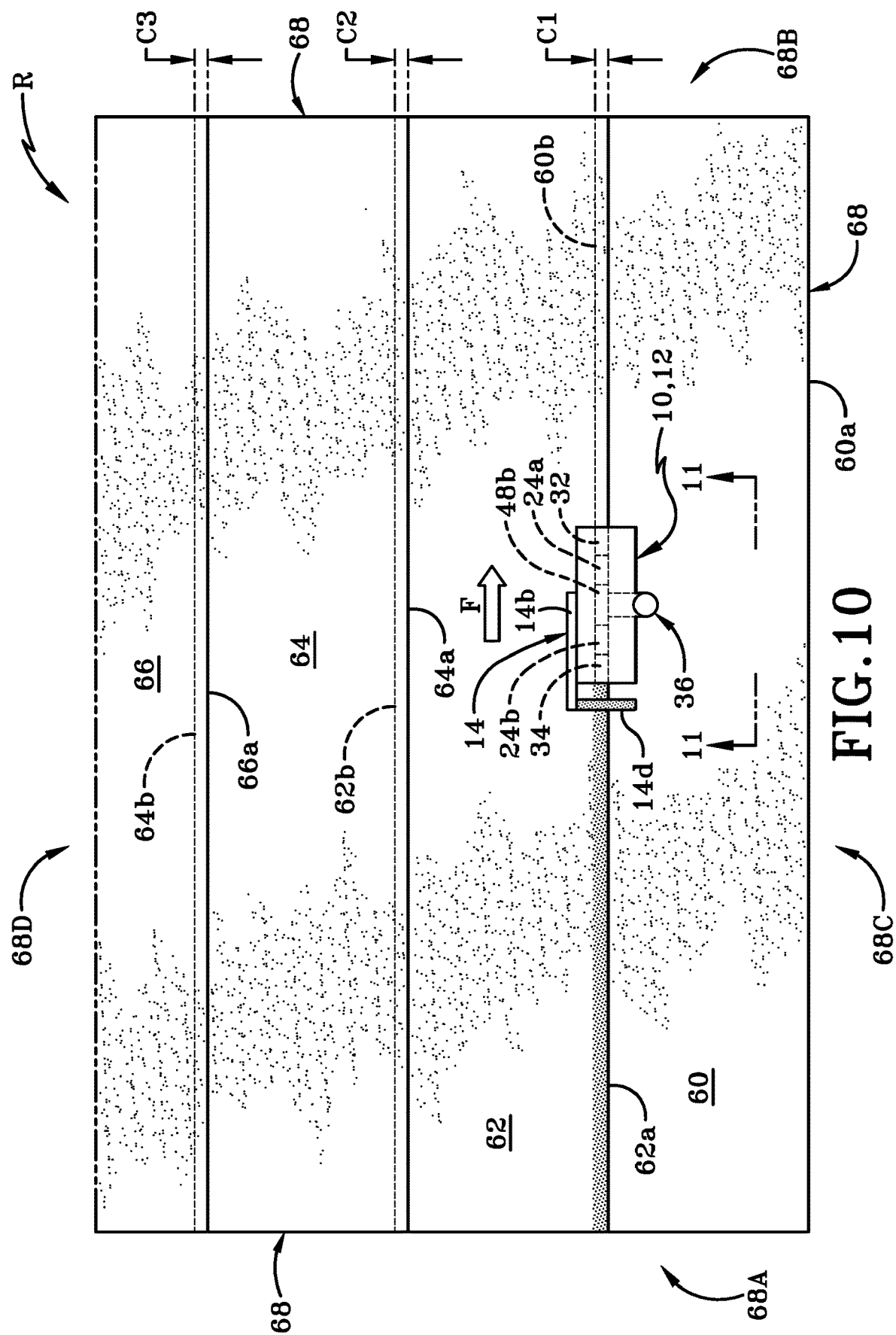
FIG. 10 is a top view of the roof of the building shown in FIG. 8, showing the welding machine part way down the first pair of overlapped strips and showing the seam welded by the machine.
Figure 13:
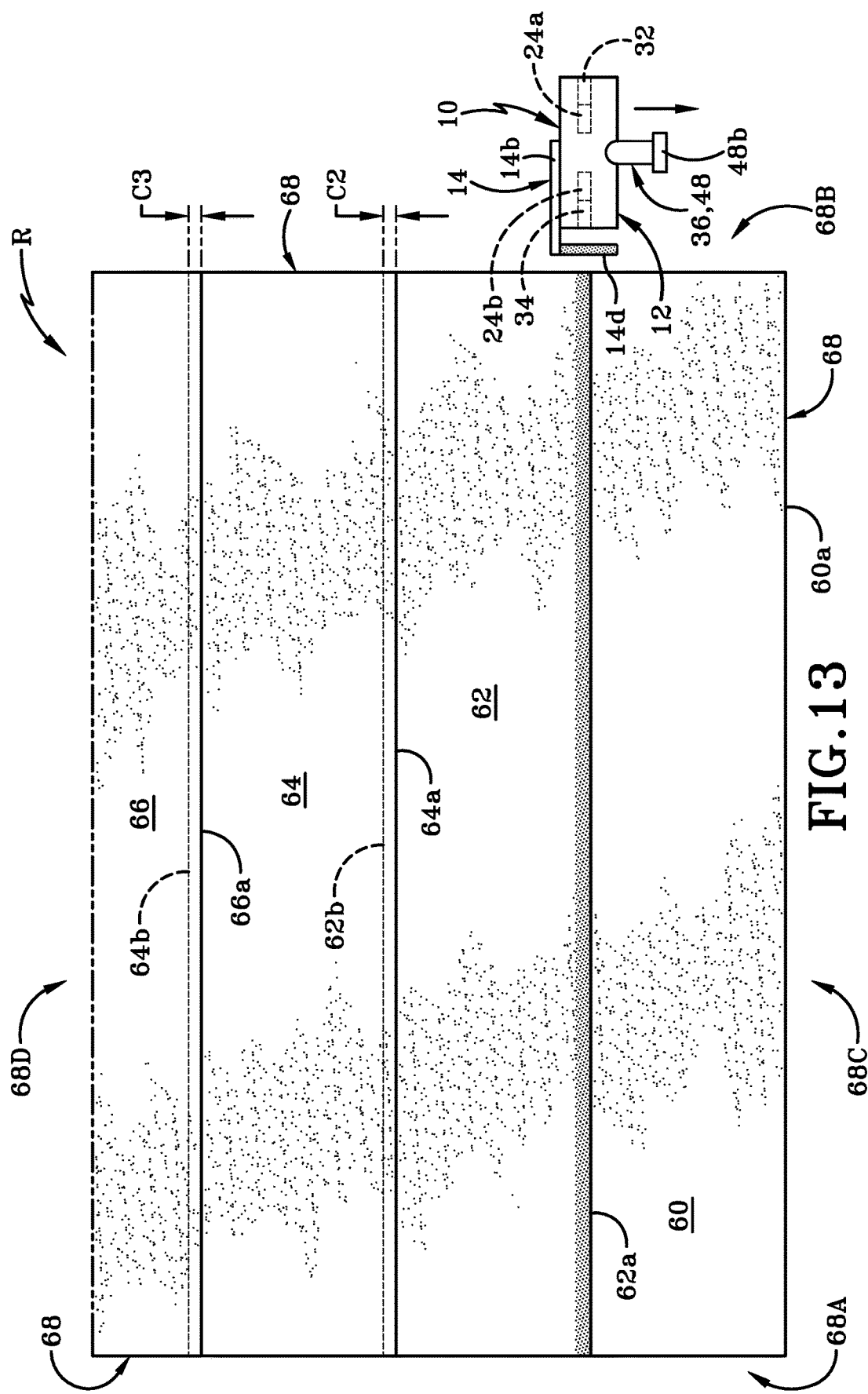
FIG. 13 is a top view of the roof of the building shown in FIG. 10 with the first seam completed and the welding machine at the end of the first pair of overlapped strips.

Air flowing from blower motor assembly 46, through hose 44, through nozzle 36, through passageway 48c and out of opening(s) 48d is heated to a predetermined temperature and thereby heats welding plate 48b and the edge regions 60b, 62a of the roofing membrane in first overlapping region "C1". It should be noted that welding plate 48b is heated to a temperature sufficient to weld the overlapped materials together. As welding machine 10 is moved in the direction of arrow "F" (FIG. 10), rear wheel 24b and rear roller 34 roll over the heated first overlapping region "C1" and the pressure applied by welding machine in conjunction with the heat applied thereby causes edge regions 60b, 62a to become welded into a seam. Welding of first overlapping region "C1" continues until the entire first overlapping region "C1" is welded in a seam. This is illustrated in FIG. 13.

Figure 14:
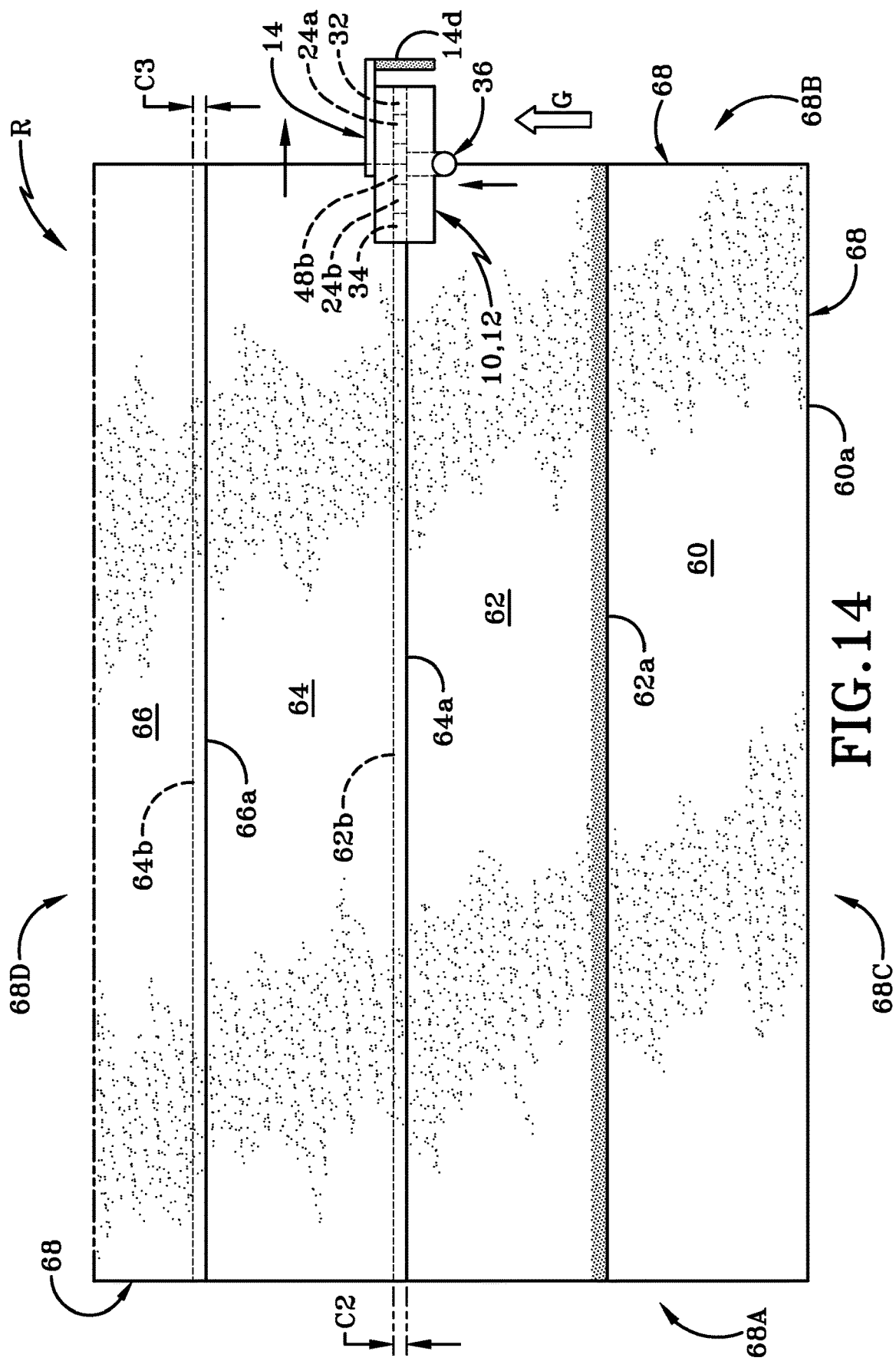
FIG. 14 is a top view of the roof of the building shown in FIG. 13 with the welding machine positioned at a beginning of a second pair of overlapped strips and showing the handle moved to the second position.

Once the welding machine 10 reaches the second end of first strip 60, the operator will move nozzle 36 from the second position to the first position. This is accomplished by the operator grasping handle 38e and moving handle 38e and thereby nozzle mounting bracket 38 in the opposite direction to arrow "D" (FIG. 9). Nozzle mounting bracket 38 rotates about axis "X" and the motion slides welding plate 48*b* out from first overlapping region "C1", moving plate 48*b* from an orientation where the plate 48*b* is substantially parallel to bottom wall 12*b* to a position where plate 48*b* is angled relative to bottom wall 12*b*. The operator also moves handle 14 from the first position (FIG. 1) to the second position shown in dashed lines in FIG. 4. Welding machine 10 is shifted laterally (in the direction of arrow "G"—FIG. 14) from proximate first overlapping region "C1" to proximate second overlapping region "C2" (FIG. 14). This lateral shifting may be accomplished by wheeling welding machine 10 across second strip 62 or by lifting welding machine 10 with gripper bars 12*h*, 12*i* and carrying it over to proximate "C2". When the machine 10 is shifted laterally, the operator will maintain the first orientation of the housing relative to the first and second end of the structure. In other words, if the front roller 32 faced second end 68B and rear roller 34 faced first end 68A when the first welding pass was made then when machine is shifted laterally, front roller 32 will still face second end 68B and rear roller 34 will still face first end 68A.

Figure 15:
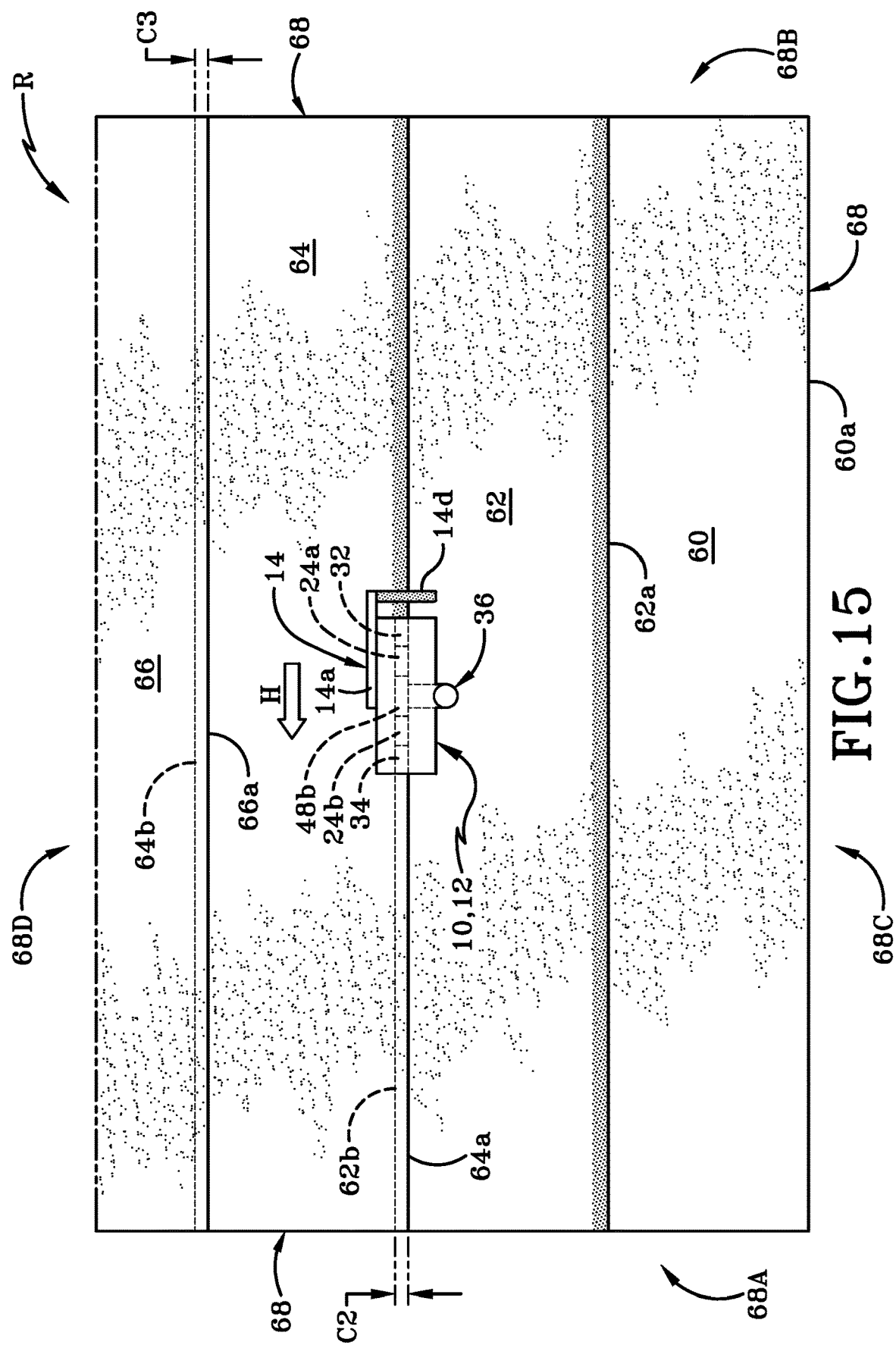
FIG. 15 is a top view of the roof of the building shown in FIG. 14 with the welding machine positioned part way along the second pair of overlapped strips and showing the welded second seam formed by the welding machine.
Figure 16:
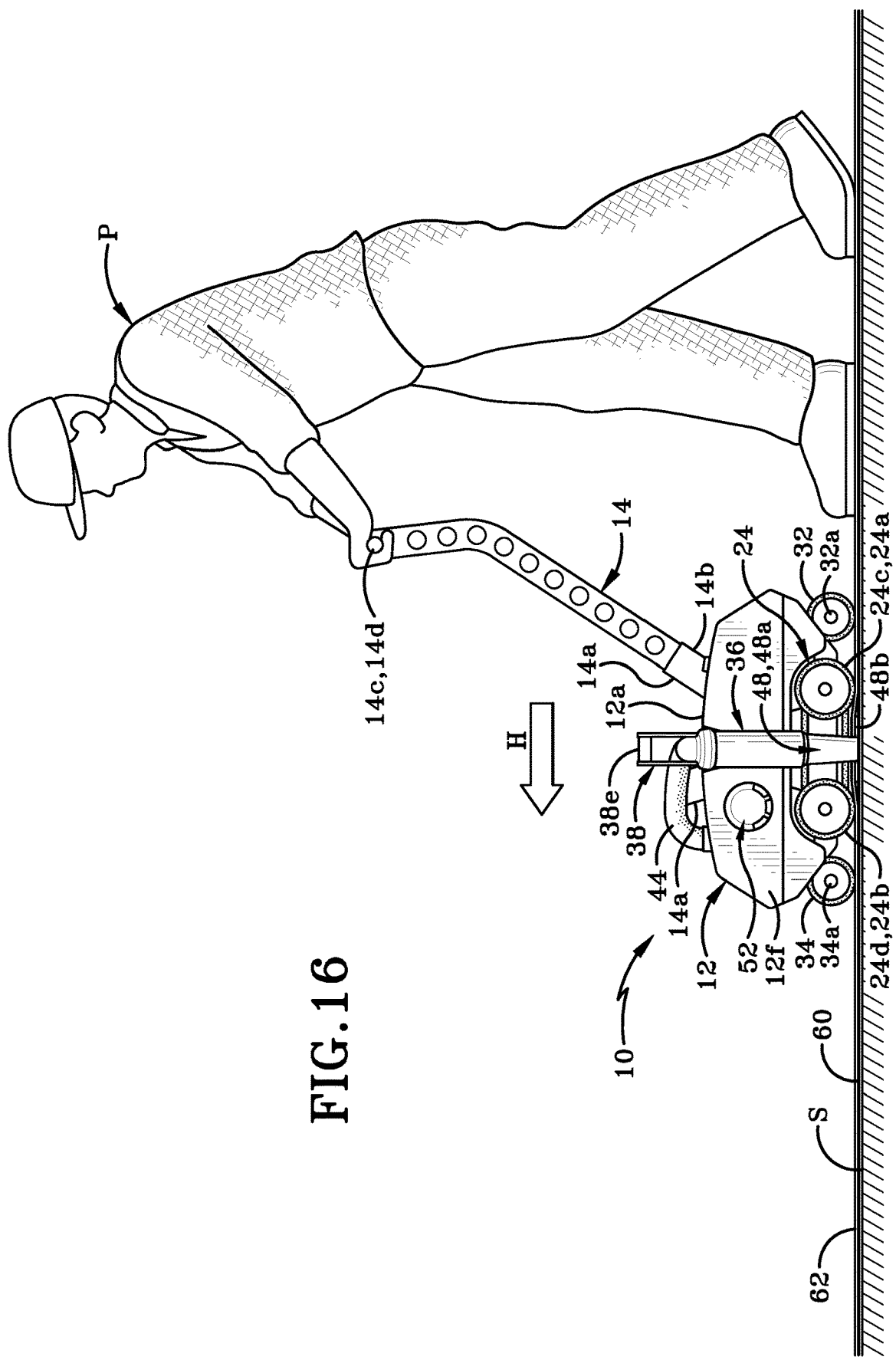
FIG. 16 is a side view of the operator holding the handle in the second position and guiding the welding machine along the second pair of overlapped strips and the welding machine moving in the opposite direction to the direction of movement during welding of the first pair of overlapped strips.

The operator will then rotate nozzle mounting bracket 38 about axis "X" from the first position to the second position as indicated by arrow "D" in FIG. 9, sliding welding plate 48*b* between a lower surface of third strip 64 and an upper surface of second strip 62. Welding machine 10, except for handle 14, is in exactly the same orientation as was the case when welding of first overlapping strip "C1" occurred. In other words, welding machine 10, even if carried from "C1" to "C2" is not rotated through 180°. So, while welding "C1", front roller 32 is the leading component of welding machine 10 traveling in the direction of arrow "F" in FIG. 12, when machine 10 is used to weld "C2" in the direction of arrow "H" (FIGS. 15 & 16) the rear roller 34 is the leading component of welding machine 10. Handle 14 is also pivoted from the position shown in FIG. 13 to the position shown in FIG. 14. The operator will then engage a control on control panel 30 that reverses the direction of current flowing through the motor of blower motor assembly 46. This causes the motor to rotate in the opposite direction, thereby driving drive belt 28 in the opposite direction, thereby rotating front wheel 24*a* in the opposite direction. The effect of this change in the direction of current is that welding machine essentially reverses along second overlapped region "C2" being guided by the operator grasping handle 14. The operator may face first end 68A of structure and walk behind machine 10, i.e., behind front roller 32.

When the end of second overlapping region "C2" is reached, the operator will move nozzle 36 from the second position back to the first position and will move handle 14 from the second position back to the first position. The operator will also engage control panel 30 and adjust the direction of current flowing through blower motor assembly 46 so that it the same as was utilized when first overlapping region "C1" was welded. Welding machine 10 will thus be returned to the condition illustrated in FIGS. 1 and 8-10. Welding machine 10 is then shifted laterally to position it adjacent third overlapping region "C3". Nozzle 36 is rotated from the first position back to the second position and so that welding plate 48*b* is inserted between the lower surface of fourth strip 66 and the upper surface of third strip 64. Welding of the third overlapping region "C3" is then accomplished by moving welding machine in the direction of arrow "F" along third overlapping region "C3". Again, front roller 32 comprises the leading component of welding machine 10 during the welding of third overlapping region "C3". At the end of the third overlapping region "C3", nozzle 36 is rotated from the second position back to the first position and if a fourth overlapping region is to be welded the machine 10 will be moved into the condition required to weld the second overlapping region "C2".

It will be understood that the operator may push welding machine 10 via handle 14, thereby actively moving the same across surface "S. Alternatively, the operator may simply guide welding machine 10 that is moved under self-propelled power by the rotating front and rear wheels 24*a*, 24*b* by simply using handle 14 to guide machine 10 along surface "S" but not actively pushing handle 14. In yet other instances, the AMD board may include programming that allows welding machine 10 to both be self-propelled and self-guided. Sensors may be provided on welding machine 10 to enable the self-guidance.

Referring to FIGS. 17-20 there is shown a second embodiment of a welding machine in accordance with an aspect of the present invention, generally indicated at 110. Welding machine 110 is substantially similar in structure and function to welding machine 10 except that various components have been slightly differently configured from the components of machine 10. As such, welding machine 110 includes a housing 112 and a handle 114 that is engaged with housing 112.

Housing 112 includes a top wall 112*a*, a bottom wall 112*b* (FIG. 20), a front wall 112*c*, a rear wall 112*d*, a left side wall 112*e*, and a right side wall 112*f* and a cross-wall 112*h*. A control panel 130 is provided on top wall 112*a*. A handle grip 113 is provided on top wall 112*a* proximate each of the front and rear walls 112*c*, 112*d*. Handle grips 113 are provided to aid an operator in manipulating and/or lifting welding machine 110. A hole (not shown) is defined in top wall 112*a* and hose 144 extends through this hole and connects to a blower motor assembly 146 (FIG. 20) within an interior chamber 112*g* of housing 112.

A mounting bracket 115 is also provided on top wall 112*a* and a pivot rod 140 engages mounting bracket 115 and secures nozzle mounting bracket 138 thereto. Nozzle mounting bracket 138 includes a first mounting plate 138*a* and a second mounting plate 138*b* that are spaced a distance longitudinally apart. A flange 138*c* extends outwardly from each of the first and second mounting plates 138*a*, 138*b*. The first and second mounting plates 138*a*, 138*b* are engaged by pivot rod 140 and are secured to mounting bracket 115 on housing 112. A gap 138*d* (FIG. 19) is defined between interior surfaces of first mounting plate 138*a* and second mounting plate 138*b*. A handle 138*e* extends between an uppermost end of first mounting plate 138*a* and an uppermost end of second mounting plate 138*b*. A portion of hose 144 extends through gap 138*d* and engages a first end of nozzle 136. Nozzle 136 includes a pair of flanges 136*a*, 136*b* (FIG. 19) that are spaced apart from each other and are particularly spaced so as to be positioned adjacent first and second mounting plates 138*a*, 138*b*, respectively. Each of the flanges 136*a*, 136*b* defines a slot therein and through which a pair of fasteners 142 are selectively engaged. Fastener 142 extend through a slot 138*f* (FIG. 18) defined in each of the first and second mounting plates 138*a*, 138*b*. Again, as with fasteners 42, fasteners 142 will move freely in slot 138 via a spring loaded mechanism and this allows nozzle 136 to be a floating nozzle that accommodates variations in the surface upon which the roofing membrane are placed. Slots 138*f* align at least partially with the slot defined in the adjacent flanges 136*a*, 136*b*. Fasteners 142 may be engaged at any point along the aligned slots in the nozzle mounting bracket 138 and on the nozzle 136 so that the position of nozzle 136 relative to housing 112 may be adjusted so as to correctly position welding head 149 beneath housing 112.

Nozzle 136 includes an elongate tube 136*d* (FIG. 18) that may be generally circular in cross-section. A connector assembly 137 is provided at a top end of tube 136*d*. Connector assembly 137 defines a first aperture therein and into which the top end of tube 136*d* is inserted and secured. Connector assembly 137 also defines a second aperture therein that is generally at right angles to the first aperture. Hose 144 enters connector assembly 137 through this second aperture. Connector assembly 137 has a width/diameter that is greater than the width of gap 138*d* defined between first and second brackets 138*a*, 138*b* of nozzle mounting bracket 138. Because of this disparity, connector assembly 137 cannot pass through gap 138*d* and hose 144 is thus held in place between nozzle mounting bracket 138 and the region where hose 144 enters top wall 112*a* of housing 112.

Figure 17:
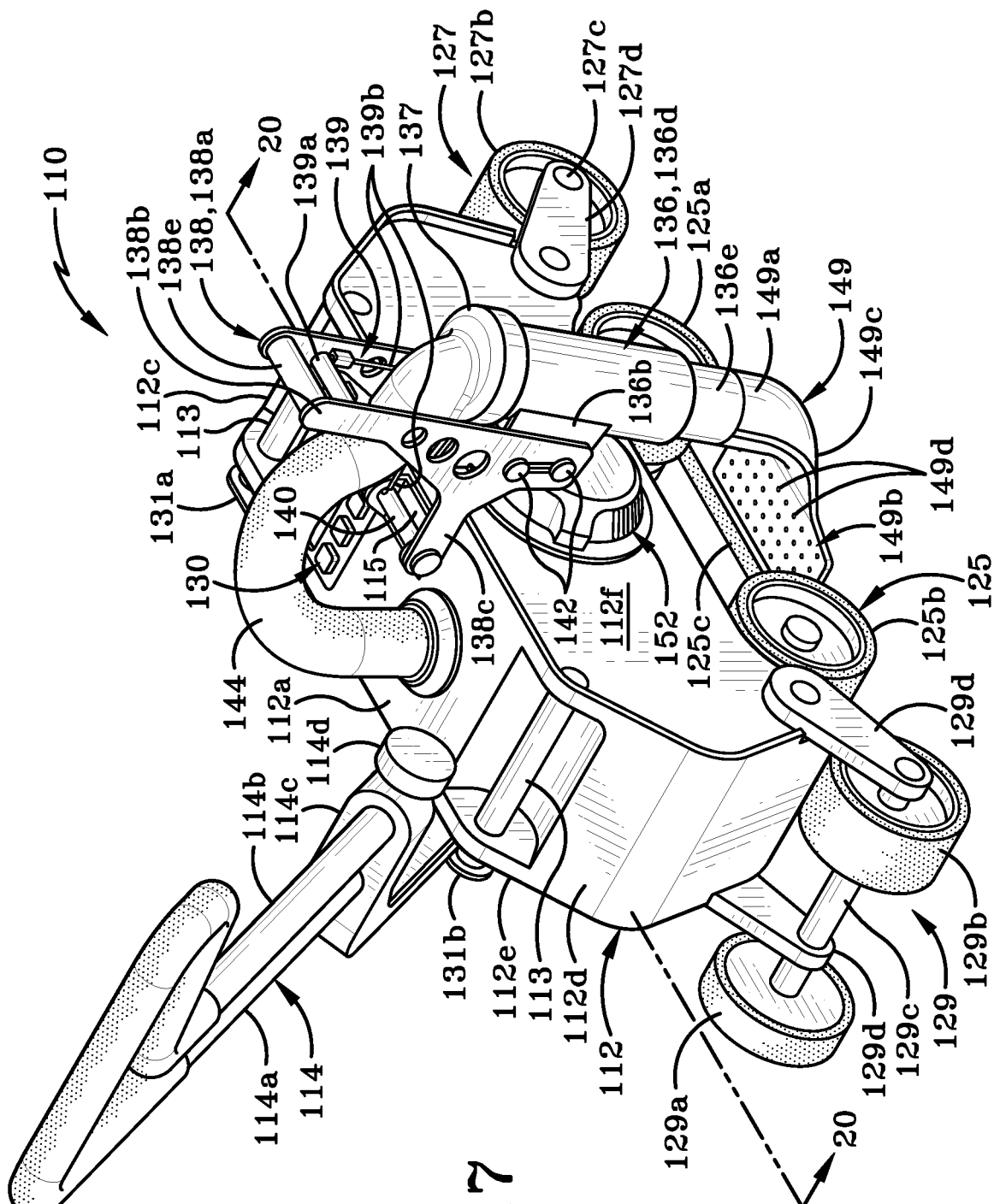
FIG. 17 is a perspective view of a second embodiment of a welding machine in accordance with an aspect of the present invention.
Figure 18:
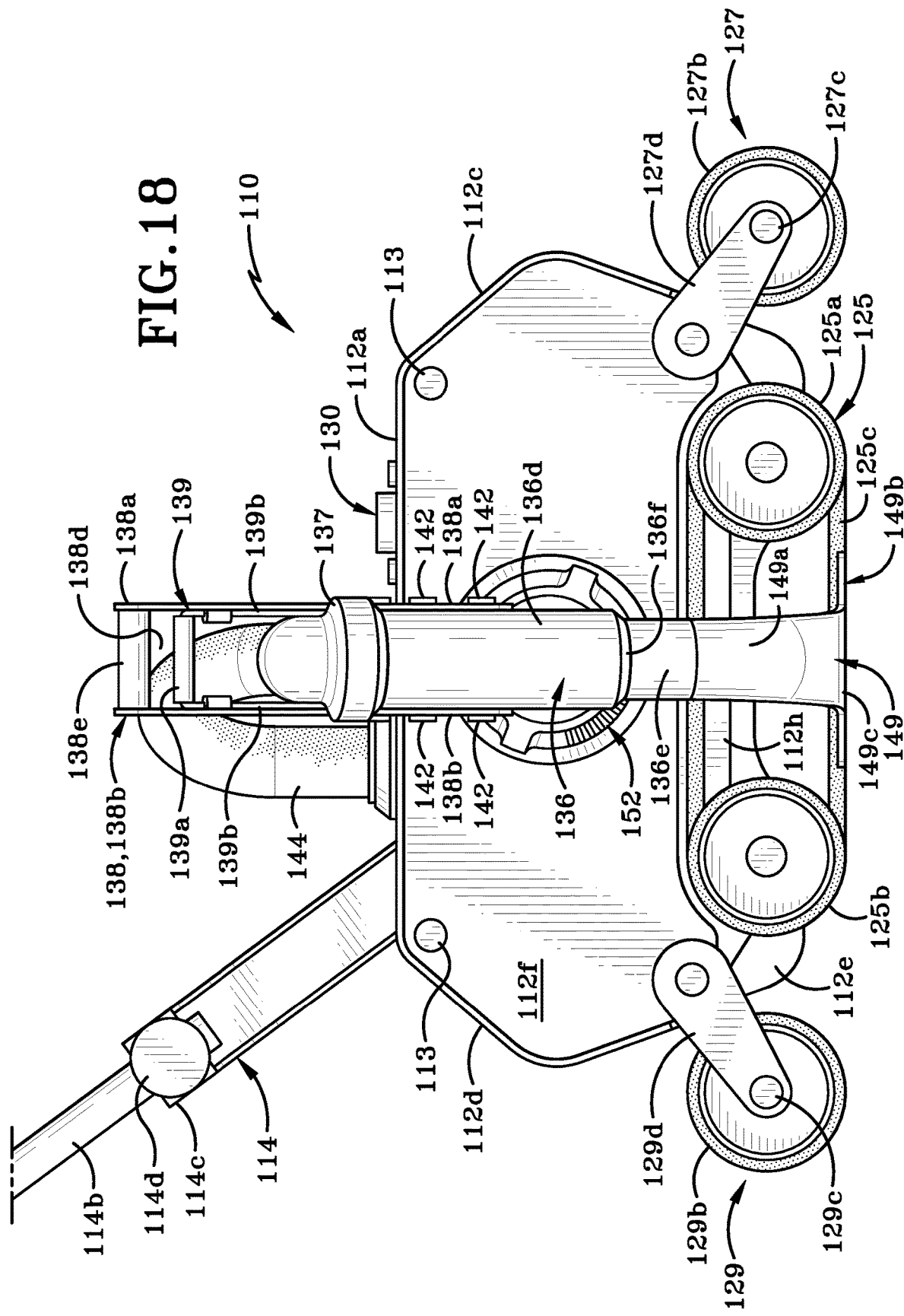
FIG. 18 is a right side view thereof.

Welding head 149 may be connected to a second end of tube 136*d* of nozzle 136. FIGS. 17 and 18 show that the second end of tube 136*d* includes a neck region indicated by the reference number 136*e*. A tapered region 136*f* may connect neck 136*e* to the second end of tube 136*d*. Neck 136*e* may be of a reduced diameter relative to a remaining portion of tube 136*d* and this narrowing may cause an acceleration in the air flow through neck 136*e*.

Welding head 149 may be generally L-shaped when viewed from the front or back (FIG. 17) and generally T-shaped when viewed from the left or right side (FIG. 18). Welding head 149 includes a first leg 149*a* and a second leg 149*b* that are oriented generally at right angles to each other. First leg 149*a* is straight along substantially its entire length, where the length of the first leg 149*a* is measured from the second end of the tubular member 136 i.e., proximate the lowermost end of neck 136*e* to proximate the corner 149*c* where first leg 149*a* and second leg 149*b* meet. Additionally, first leg 149*a* and tubular member 136*d*/136*e* are substantially aligned along a common axis or plane. First leg 149*a* has a first end that is generally circular in cross-section and is engaged with neck 136*e* of nozzle 136. First leg 149*a* is of substantially the same diameter as neck 136*e* until proximate the corner 149*c* first leg 149*a* becomes wider but narrower. The width of first leg 149*a* is that distance between front surface and a rear surface thereof, where the front surface faces the same direction as front wall 112*c* of housing and the rear surfaces faces the same direction as rear wall 112*d*. The narrowness of first leg 149*a* is that distance between the left and right side surfaces thereof, i.e., the surfaces that face generally the same directions as left and right sides 112*e*, 112*f* of housing 112.

Second leg 149*b* of welding head 149 proceeds outwardly from the corner 149*c* and flattens into a planar member (FIG. 17). This planar member may be generally rectangular in shape and has an upper surface, seen in FIG. 17, that faces bottom wall 112*b* of housing when welding head 149 is in the operational position for welding (shown in FIG. 17). The lower surface of this planar member is positioned proximate the surface over which welding machine 110 travels when welding head 149 is in the operational position. One or both of the upper and lower surfaces of second leg 149*b* define a plurality of openings 149*d* therein that allow heated air from hose 44 to flow outwardly therefrom. The planar member of welding head 149 may also define openings therein that are similarly positioned to openings 48*d* in welding head 48.

Figure 19:
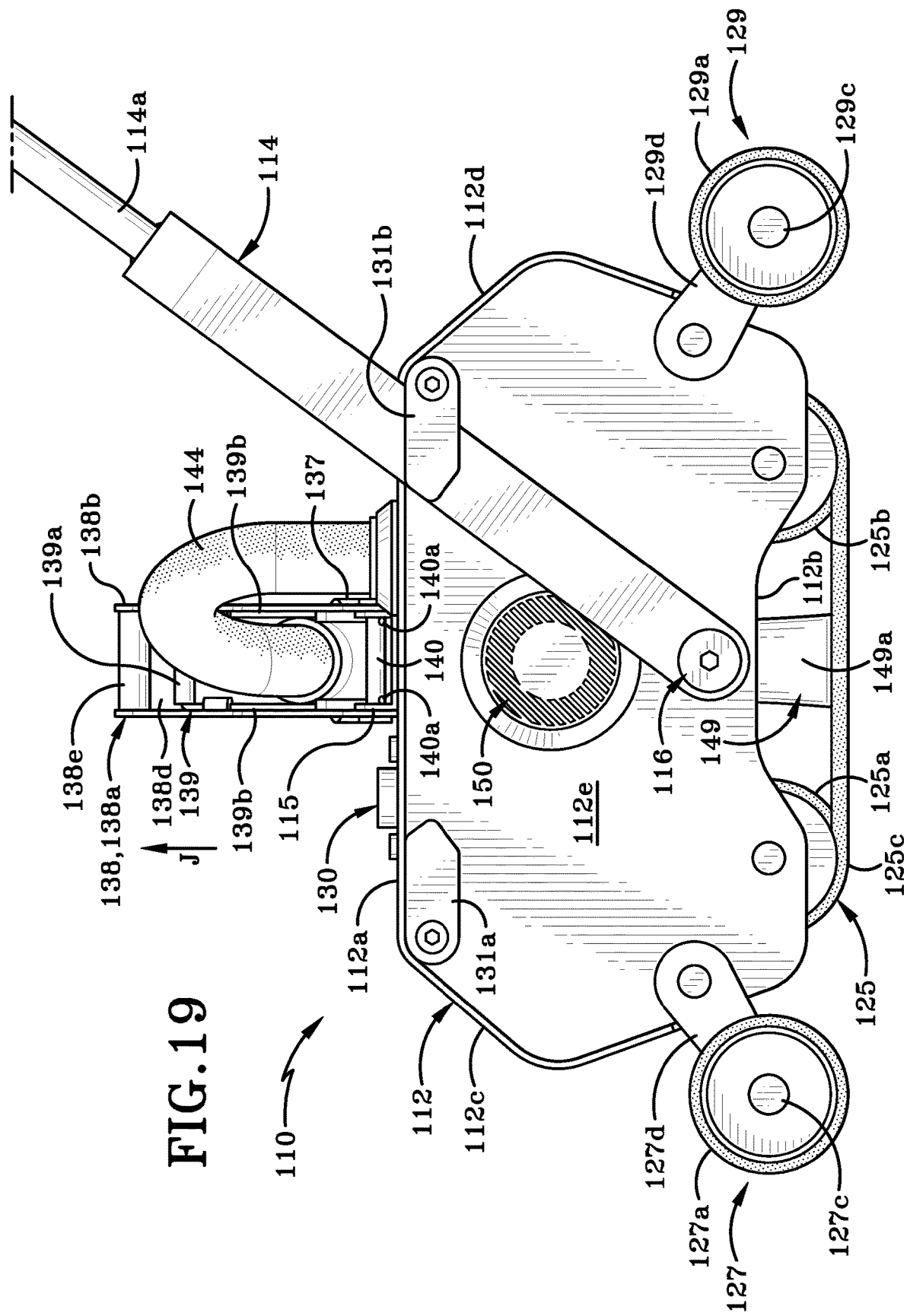
FIG. 19 is a left side view thereof.
Figure 20:
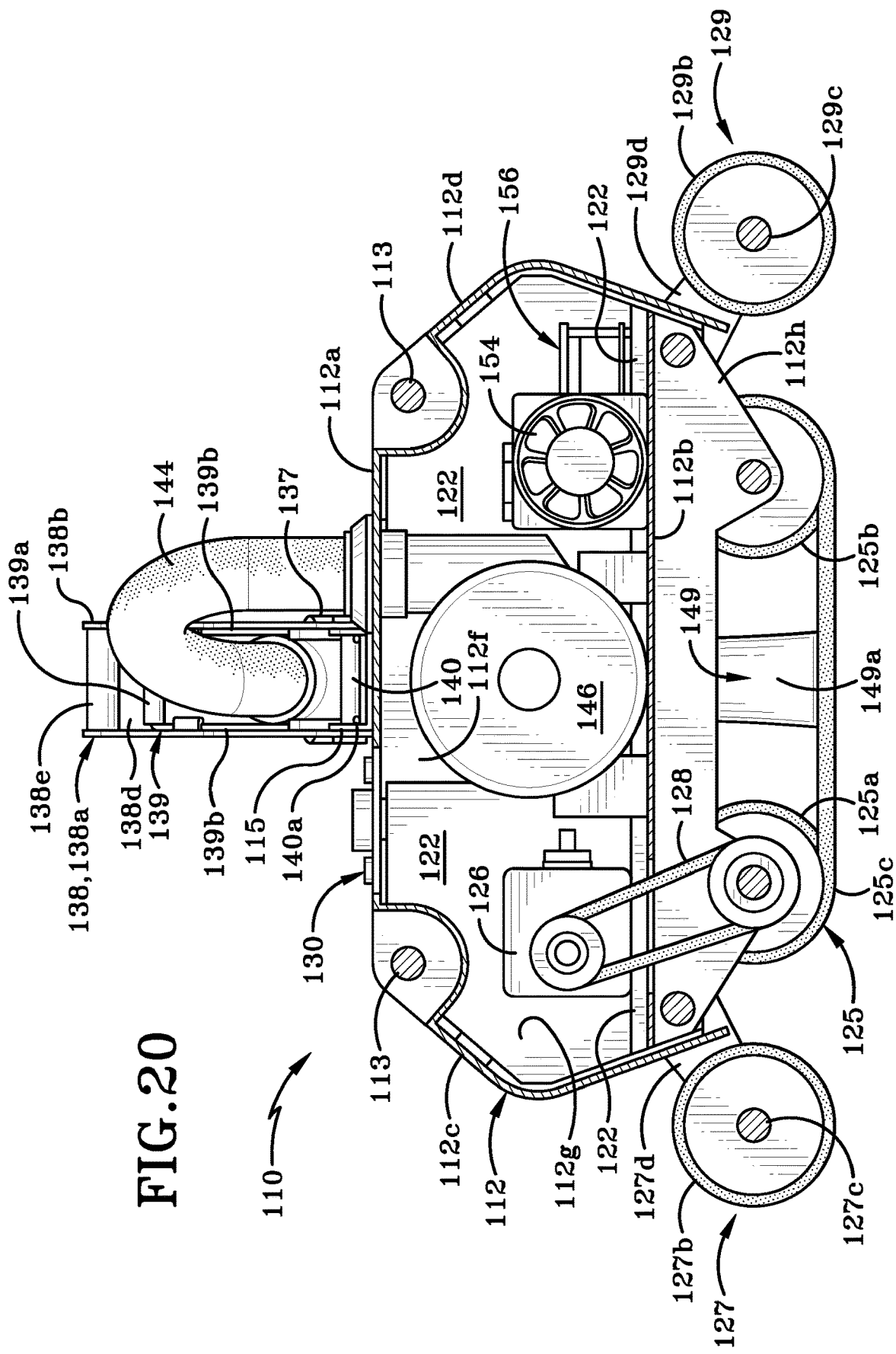
FIG. 20 is a longitudinal cross-section of the welding machine taken along line 20-20 of FIG. 17.

Nozzle 136 and welding head 149 are used in the same manner as nozzle 38 and welding head 48 and therefore the operation of the same will not be described herein in any further detail. Welding machine 110 does include a locking mechanism 139 that is engaged with nozzle mounting bracket 138. Locking mechanism 139 may include a locking handle 139*a* and one or more cables 139*b* that extend from locking handle 139*a* to pivot rod 140. Although not illustrated herein, locking mechanism 139 may also include a spring that urges locking handle 139*a* into the position shown in FIGS. 17-19. Cable(s) 139*b* engage in apertures 140*a* (FIG. 19) in pivot rod 140. When it is desired to pivot nozzle 136, the operator will squeeze handle 139*a* toward handle 138*e* in the direction of arrow "J" (FIG. 19). This motion will pull cables 139*b* in the direction of arrow "J" which in turn releases pivot rod 140 from a locking engagement with mounting bracket 115 and so that rod 140 may be able to rotate about an axis extending along its length. Nozzle mounting bracket 138 and thereby nozzle 136 is then free to be pivoted between a first and second position in the same manner as described with reference to nozzle mounting bracket 38 and nozzle 36. When it is desired to lock nozzle mounting bracket 138 in place, handle 139*a* is released and the handle therefore returns to its original position by moving in the opposite direction to arrow "J" under the force of the spring in handle 139*a* returning to its original position. Although not illustrated in the attached figures, it will be understood that pivot rod 140 may include locking detents which engage in slots provided in mounting bracket 115 when rod 140 is pivoted back to its original position by cables 139*b* when handle 139*a* returns to its original position.

In addition to blower motor assembly 146, housing 112 also retains within chamber 112*g* a cooling assembly 154, a power source and AMD board 156 and stepper motor 126, all of which are operatively engaged with control panel 130. Air vents 150 (FIG. 19) and 152 (FIG. 17) for blower motor assembly 146 are also provided on housing 112 and serve the same purpose as vents 50 and 52.

Stepper motor 126 is operatively engaged, via drive belt 128 (FIG. 20), to a roller assembly 146. Drive belt 128, line drive belt 24*g*, is an air dam belt that traps hot air from welding nozzle 136 in the area of the membrane to be welded. This air dam belt aids in creating a clean weld. Roller assembly 125 includes a front roller 125*a*, a rear roller 125*b*, and a drive belt 126 that extends around front and rear rollers 125*a*, 125*b*. Drive belt 128 rotates front roller 125*a* and that motion is transferred to drive belt 125*c* and thereby to rear roller 125*b*. Front roller 125*a* is positioned in front of the planar member/second leg 149*b* of welding head 149. Rear roller 125*b* is positioned rearwardly of the planar member/second leg 149*b*. A weight 122 is provided within chamber 112*g* of housing 112. Weight 122 extends from proximate front wall 112*c* to proximate rear wall 112*d* and may be positioned in such a way that it is aligned along the same plane as front and rear rollers 125*a*, 125*b*. This arrangement of weight 122 relative to rollers 125*a*, 125*b* ensures that the weight is directed to those parts of welding machine 110 that apply pressure to an overlapped region of the material being welded.

Welding machine 110 also includes a front wheel assembly 127 and a rear wheel assembly 129. Front wheel assembly 127 comprises front wheels 127*a*, 127*b* that are connected by a shaft 127*c*. Shaft 127*c* is operative engaged with housing 112 via mounting flanges 127*d*. Rear wheel assembly 129 comprises rear wheels 129*a*, 129*b* that are connected by a shaft 129*c*. Shaft 129*c* is operatively engaged with housing 112 via mounting flanges 129*d*. Preferably, front wheel 127*b* and rear wheel 129*b* are longitudinally aligned with front and rear rollers 125a, 125b as this configuration aids in applying sufficient pressure to weld a heated overlapped region of the material being welded by machine 110 whether machine 110 is operated in a forward direction or in a reverse direction.

Welding machine 110 also includes a handle 114 that is pivotally engaged with housing 112 via a pivot rod 116 (FIG. 19). A pair of receiving brackets 131a, 131b may be provided on left side wall 112e of housing 112, with bracket 131a being located on an upper region of left side wall 112e proximate front wall 112c and bracket 131b being located on an upper region of left side wall 112e proximate rear wall 112d. Brackets 131a, 131b are mounted on extensions of handle grips 113 or on housing 112 in such a way that a gap is defined between left sidewall 112e and the respective bracket 131a, 131b. A portion of handle 114 is selectively received in this gap when handle 114 is pivoted between one or the other of the first and second positions. Brackets 131a, 131b may serve as anchors for the handle 114 to be twisted to steer machine 110 during a welding operation. When handle 114 contacts brackets 131a, 131b they act as a stop that will receive forces from handle 114 in order to tilt machine 110 onto front or rear wheel assemblies 127, 129.

Handle 114 may be adjustable in length and comprise two shafts 114a, 114b (FIG. 17) that re received in a mounting block 114c. An adjustment knob 114d is provided on mounting block 114c and knob 114d is rotated in a first direction to release shafts 114a, 114b so that handle 114 may be selectively extended or reduced in overall length. Knob 114d is rotated in the opposite direction to lock shafts 114a, 114b to mounting block 114c and thereby lock handle 114 at a selected length.

Handle 14 or 114 is also used to help tilt machine 10/110 so that it may be more easily maneuvered over a surface. Handle 14/114, when in either of the first and second positions, may be used to tilt machine 10/110 back onto one or the other of front and rear rollers 32, 34 or front or rear wheel assemblies 127, 129. When so tilted by handle 14/114, the machine 10/110 may be wheeled across the surface on the roller 32, 34 or wheel assembly 127, 129 closest to the operator.

Figure 4A:
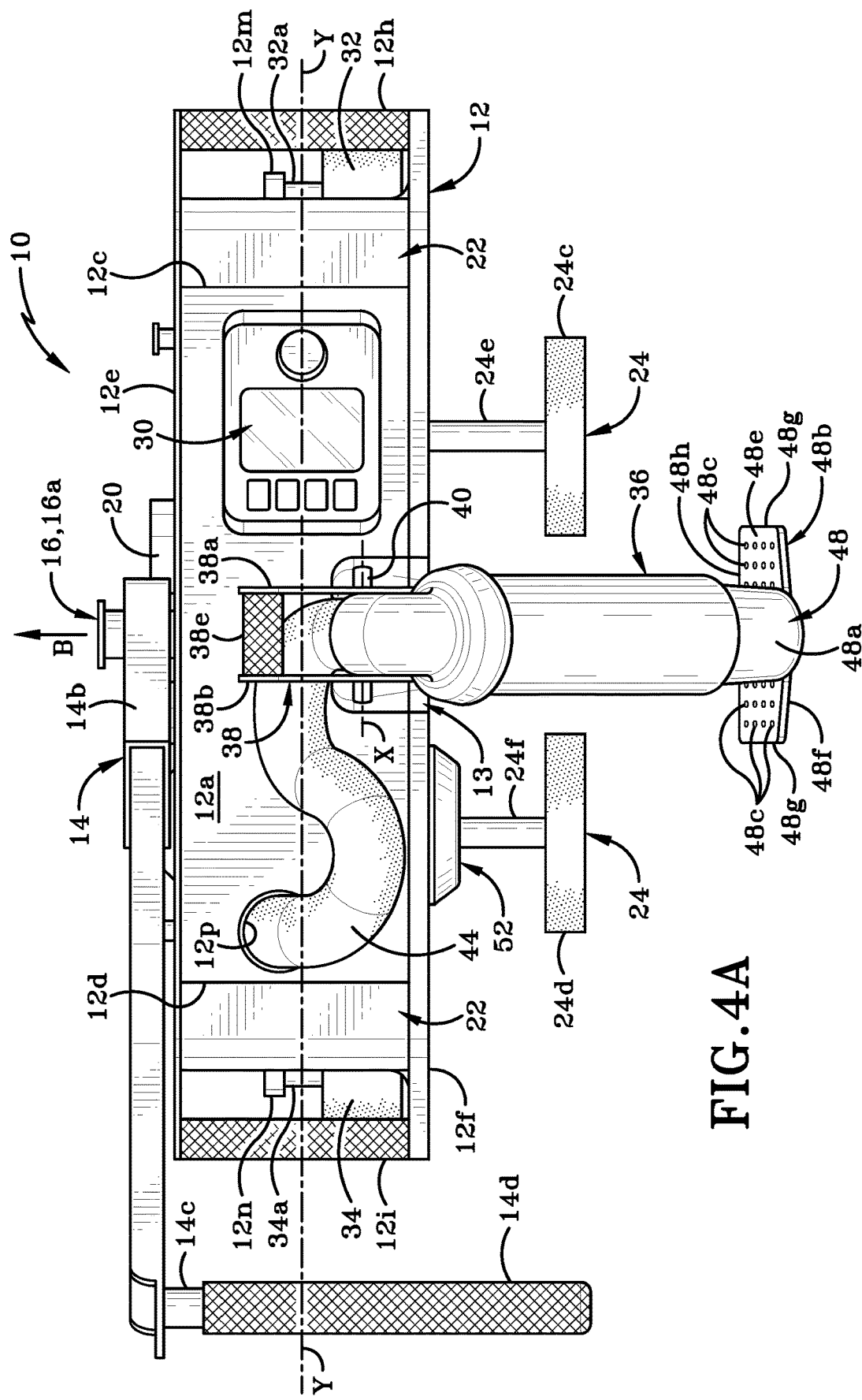
FIG. 4A is a top view of the welding machine showing various components that are specifically colored to indicate to an operator that the components are not hot and safe to touch.
Figure 5:
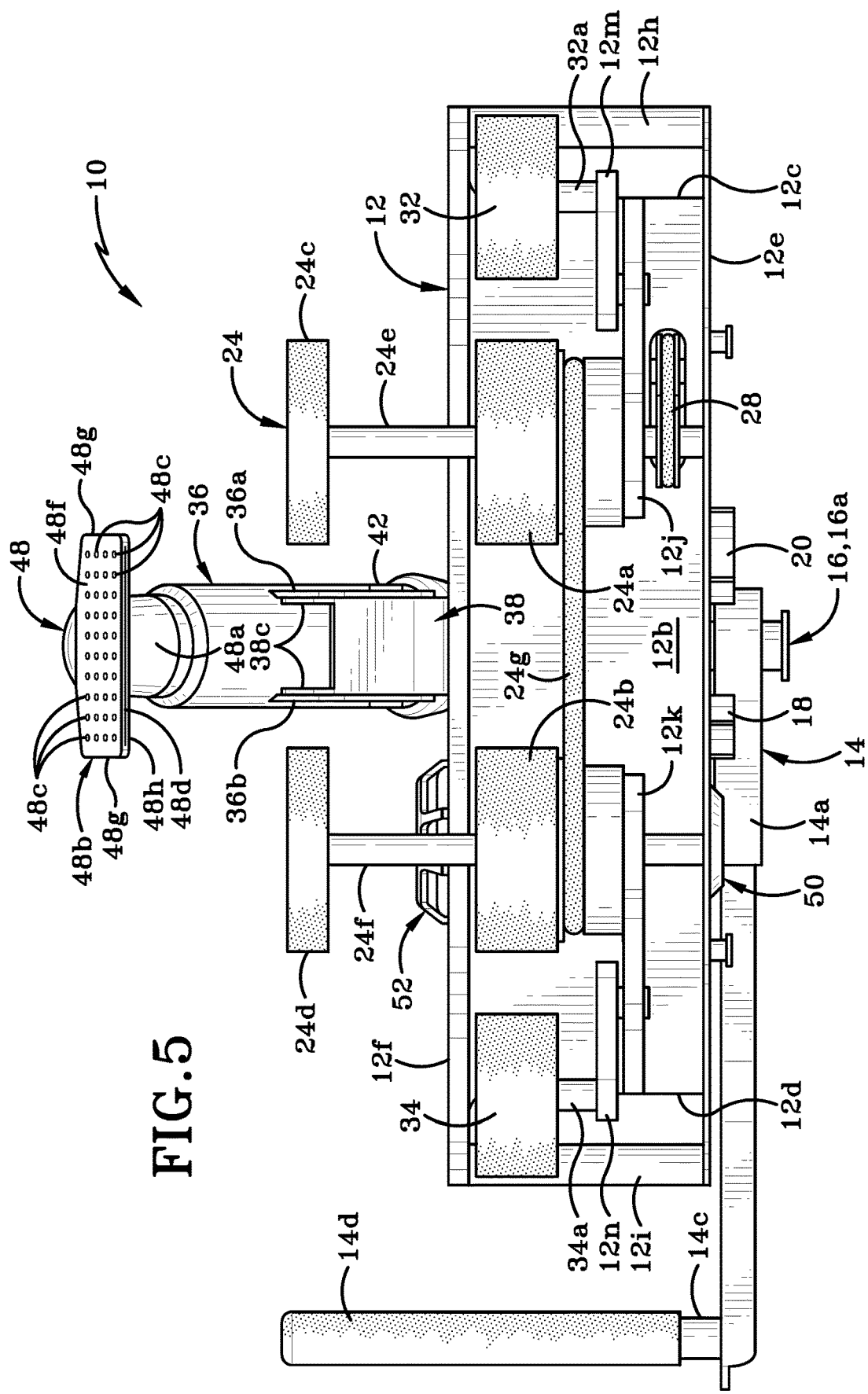
FIG. 5 is a bottom view of the welding machine.

As shown in FIG. 4A, various parts of welding machine 10 may be specially colored, such as by painting, so as to indicate to an operator that those particular parts of machine 10 are not hot or at least cool enough to touch and are therefore able to be safely touched and handled by the operator. The specially colored parts differ in color from a remainder of the machine. For example first and second gripper bars 12h, 12i may be painted orange to indicate that an operator may safely touch these components and lift and maneuver the machine 10. The rest of the machine 10 may be colored in any color other than orange, such as green, for example. Additionally, handle 38e on nozzle 36/48 may also be painted orange to indicate it may be safely grasped to manipulate nozzle 36. (It will be understood that the color "orange" is an exemplary color only and that any other desired color, such as green, may be used for this purpose.) Still further, handles 14 and/or 114 (FIG. 4A and FIG. 17) may be specially colored to indicate they may be safely touched.

A method of heat welding a series of overlapped regions "C1", "C2", "C3" of adjacent strips of flexible material that extend from a first end 68A (FIG. 10) of a structure to a second end 68B of the structure includes the steps of providing a heat welding machine 10 (or 110) comprising a housing 12 with front and rear ends and with a longitudinal axis "Y" extending therebetween; a wheel train 24 engaged with housing 12; a nozzle 36 engaged with housing 12 and having a welding head 48 at a free end thereof; a front pressure roller 32 engaged with housing 12 and positioned forwardly of welding head 48; and a rear pressure roller 34 engaged with housing 12 and positioned rearwardly of welding head 48; positioning welding machine 10 at first end 68A of the structure and adjacent a first end of first overlapped region "C1"; inserting welding head 48 between an overlap layer 62a and an underlap layer 60a of first overlapped region "C1"; heating welding head 48, moving housing 12 via wheel train 24 in a forward direction "F" along first overlapped region "C1" and toward second end 68B of the structure; applying heat from welding head 48 to first overlapped region "C1" as housing 12 moves in forward direction "F"; applying pressure to the heated first overlapped region "C1" as housing 12 moves in forward direction "F"; welding first overlapped region "C1"; reaching second end 68B of the structure and a second end of first overlapped region "C1"; moving welding machine 10 laterally from the second end of first overlapped region "C1" to a first end of a second overlapped region, "C2" where the first end of the second overlapped region "C2" is located at second end 68B of the structure; engaging welding head 48 in second overlapped region "C2"; moving welding machine 10 from second end 68B of the structure toward first end 68A of the structure in a reverse direction (opposite to "F"); applying heat from welding head 48 to second overlapped region "C2" as housing 12 moves in the reverse direction; applying pressure to heated second overlapped region "C2" as housing 12 moves in the reverse direction; welding second overlapped region "C2" with welding head 48 while moving in the reverse direction; and reaching first end 68A of the structure and a second end of second overlapped region "C2".

It will be understood that while welding machine 10 has been described herein as being useful for welding strips of a thermoplastic, flexible roofing membrane together, welding machine 10 may be utilized in other industrial applications to weld other types of materials together. Welding machine 10 may therefore be able to be downsized or upsized and caused to travel across surfaces other than roofs. Additionally, the operation of welding machine may be automated by inclusion of appropriate programming in a CPU or AMD board so that an operator is not necessarily needed to engage handle 14 to move welding machine 10 across a surface. In these instances, the handle 14 may be completely omitted or be detachable or be folded during use and only moved into an operational position for manipulating welding machine 10 from one overlapped region of a material to another overlapped region. Welding machine 10 may also be provided with guide wheels, GPS type positioning or tracking or any other mechanism that would aid the machine in being self-guided or self-propelled.

In the foregoing description, certain terms have been used for brevity, clearness, and understanding. No unnecessary limitations are to be implied therefrom beyond the requirement of the prior art because such terms are used for descriptive purposes and are intended to be broadly construed.

Moreover, the description and illustration set out herein are an example and the invention is not limited to the exact details shown or described.

Also, various inventive concepts may be embodied as one or more methods, of which an example has been provided. The acts performed as part of the method may be ordered in any suitable way. Accordingly, embodiments may be constructed in which acts are performed in an order different than illustrated, which may include performing some acts simultaneously, even though shown as sequential acts in illustrative embodiments.

While various inventive embodiments have been described and illustrated herein, those of ordinary skill in the art will readily envision a variety of other means and/or structures for performing the function and/or obtaining the results and/or one or more of the advantages described herein, and each of such variations and/or modifications is deemed to be within the scope of the inventive embodiments described herein. More generally, those skilled in the art will readily appreciate that all parameters, dimensions, materials, and configurations described herein are meant to be exemplary and that the actual parameters, dimensions, materials, and/or configurations will depend upon the specific application or applications for which the inventive teachings is/are used. Those skilled in the art will recognize, or be able to ascertain using no more than routine experimentation, many equivalents to the specific inventive embodiments described herein. It is, therefore, to be understood that the foregoing embodiments are presented by way of example only and that, within the scope of the appended claims and equivalents thereto, inventive embodiments may be practiced otherwise than as specifically described and claimed. Inventive embodiments of the present disclosure are directed to each individual feature, system, article, material, kit, and/or method described herein. In addition, any combination of two or more such features, systems, articles, materials, kits, and/or methods, if such features, systems, articles, materials, kits, and/or methods are not mutually inconsistent, is included within the inventive scope of the present disclosure.

The above-described embodiments can be implemented in any of numerous ways. For example, embodiments of technology disclosed herein may be implemented using hardware, software, or a combination thereof. When implemented in software, the software code or instructions can be executed on any suitable processor or collection of processors, whether provided in a single computer or distributed among multiple computers. Furthermore, the instructions or software code can be stored in at least one non-transitory computer readable storage medium.

Also, a computer or smartphone utilized to execute the software code or instructions via its processors may have one or more input and output devices. These devices can be used, among other things, to present a user interface. Examples of output devices that can be used to provide a user interface include printers or display screens for visual presentation of output and speakers or other sound generating devices for audible presentation of output. Examples of input devices that can be used for a user interface include keyboards, and pointing devices, such as mice, touch pads, and digitizing tablets. As another example, a computer may receive input information through speech recognition or in other audible format.

Such computers or smartphones may be interconnected by one or more networks in any suitable form, including a local area network or a wide area network, such as an enterprise network, and intelligent network (IN) or the Internet. Such networks may be based on any suitable technology and may operate according to any suitable protocol and may include wireless networks, wired networks or fiber optic networks.

The various methods or processes outlined herein may be coded as software/instructions that is executable on one or more processors that employ any one of a variety of operating systems or platforms. Additionally, such software may be written using any of a number of suitable programming languages and/or programming or scripting tools, and also may be compiled as executable machine language code or intermediate code that is executed on a framework or virtual machine.

In this respect, various inventive concepts may be embodied as a computer readable storage medium (or multiple computer readable storage media) (e.g., a computer memory, one or more floppy discs, compact discs, optical discs, magnetic tapes, flash memories, USB flash drives, SD cards, circuit configurations in Field Programmable Gate Arrays or other semiconductor devices, or other non-transitory medium or tangible computer storage medium) encoded with one or more programs that, when executed on one or more computers or other processors, perform methods that implement the various embodiments of the disclosure discussed above. The computer readable medium or media can be transportable, such that the program or programs stored thereon can be loaded onto one or more different computers or other processors to implement various aspects of the present disclosure as discussed above.

The terms "program" or "software" or "instructions" are used herein in a generic sense to refer to any type of computer code or set of computer-executable instructions that can be employed to program a computer or other processor to implement various aspects of embodiments as discussed above. Additionally, it should be appreciated that according to one aspect, one or more computer programs that when executed perform methods of the present disclosure need not reside on a single computer or processor, but may be distributed in a modular fashion amongst a number of different computers or processors to implement various aspects of the present disclosure.

Computer-executable instructions may be in many forms, such as program modules, executed by one or more computers or other devices. Generally, program modules include routines, programs, objects, components, data structures, etc. that perform particular tasks or implement particular abstract data types. Typically the functionality of the program modules may be combined or distributed as desired in various embodiments.

Also, data structures may be stored in computer-readable media in any suitable form. For simplicity of illustration, data structures may be shown to have fields that are related through location in the data structure. Such relationships may likewise be achieved by assigning storage for the fields with locations in a computer-readable medium that convey relationship between the fields. However, any suitable mechanism may be used to establish a relationship between information in fields of a data structure, including through the use of pointers, tags or other mechanisms that establish relationship between data elements.

All definitions, as defined and used herein, should be understood to control over dictionary definitions, definitions in documents incorporated by reference, and/or ordinary meanings of the defined terms.

"Logic", as used herein, includes but is not limited to hardware, firmware, software and/or combinations of each to perform a function(s) or an action(s), and/or to cause a function or action from another logic, method, and/or system. For example, based on a desired application or needs, logic may include a software controlled microprocessor, discrete logic like a processor (e.g., microprocessor), an application specific integrated circuit (ASIC), a programmed logic device, a memory device containing instructions, an electric device having a memory, or the like. Logic may include one or more gates, combinations of gates, or other circuit components. Logic may also be fully embodied as software. Where multiple logics are described, it may be possible to incorporate the multiple logics into one physical logic. Similarly, where a single logic is described, it may be possible to distribute that single logic between multiple physical logics.

Furthermore, the logic(s) presented herein for accomplishing various methods of this system may be directed towards improvements in existing computer-centric or internet-centric technology that may not have previous analog versions. The logic(s) may provide specific functionality directly related to structure that addresses and resolves some problems identified herein. The logic(s) may also provide significantly more advantages to solve these problems by providing an exemplary inventive concept as specific logic structure and concordant functionality of the method and system. Furthermore, the logic(s) may also provide specific computer implemented rules that improve on existing technological processes. The logic(s) provided herein extends beyond merely gathering data, analyzing the information, and displaying the results. Further, portions or all of the present disclosure may rely on underlying equations that are derived from the specific arrangement of the equipment or components as recited herein. Thus, portions of the present disclosure as it relates to the specific arrangement of the components are not directed to abstract ideas. Furthermore, the present disclosure and the appended claims present teachings that involve more than performance of well-understood, routine, and conventional activities previously known to the industry. In some of the method or process of the present disclosure, which may incorporate some aspects of natural phenomenon, the process or method steps are additional features that are new and useful.

The articles "a" and "an," as used herein in the specification and in the claims, unless clearly indicated to the contrary, should be understood to mean "at least one." The phrase "and/or," as used herein in the specification and in the claims (if at all), should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified. Thus, as a non-limiting example, a reference to "A and/or B", when used in conjunction with open-ended language such as "comprising" can refer, in one embodiment, to A only (optionally including elements other than B); in another embodiment, to B only (optionally including elements other than A); in yet another embodiment, to both A and B (optionally including other elements); etc. As used herein in the specification and in the claims, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of," or, when used in the claims, "consisting of," will refer to the inclusion of exactly one element of a number or list of elements. In general, the term "or" as used herein shall only be interpreted as indicating exclusive alternatives (i.e. "one or the other but not both") when preceded by terms of exclusivity, such as "either," "one of," "only one of," or "exactly one of." "Consisting essentially of," when used in the claims, shall have its ordinary meaning as used in the field of patent law.

As used herein in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified. Thus, as a non-limiting example, "at least one of A and B" (or, equivalently, "at least one of A or B," or, equivalently "at least one of A and/or B") can refer, in one embodiment, to at least one, optionally including more than one, A, with no B present (and optionally including elements other than B); in another embodiment, to at least one, optionally including more than one, B, with no A present (and optionally including elements other than A); in yet another embodiment, to at least one, optionally including more than one, A, and at least one, optionally including more than one, B (and optionally including other elements); etc.

When a feature or element is herein referred to as being "on" another feature or element, it can be directly on the other feature or element or intervening features and/or elements may also be present. In contrast, when a feature or element is referred to as being "directly on" another feature or element, there are no intervening features or elements present. It will also be understood that, when a feature or element is referred to as being "connected", "attached" or "coupled" to another feature or element, it can be directly connected, attached or coupled to the other feature or element or intervening features or elements may be present. In contrast, when a feature or element is referred to as being "directly connected", "directly attached" or "directly coupled" to another feature or element, there are no intervening features or elements present. Although described or shown with respect to one embodiment, the features and elements so described or shown can apply to other embodiments. It will also be appreciated by those of skill in the art that references to a structure or feature that is disposed "adjacent" another feature may have portions that overlap or underlie the adjacent feature.

Spatially relative terms, such as "under", "below", "lower", "over", "upper" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if a device in the figures is inverted, elements described as "under" or "beneath" other elements or features would then be oriented "over" the other elements or features. Thus, the exemplary term "under" can encompass both an orientation of over and under. The device may be otherwise oriented (rotated 90 degrees or at other orientations) and the spatially relative descriptors used herein interpreted accordingly. Similarly, the terms "upwardly", "downwardly", "vertical", "horizontal", "lateral" and the like are used herein for the purpose of explanation only unless specifically indicated otherwise.

Although the terms "first" and "second" may be used herein to describe various features/elements, these features/elements should not be limited by these terms, unless the context indicates otherwise. These terms may be used to distinguish one feature/element from another feature/element. Thus, a first feature/element discussed herein could be termed a second feature/element, and similarly, a second feature/element discussed herein could be termed a first feature/element without departing from the teachings of the present invention.

An embodiment is an implementation or example of the present disclosure. Reference in the specification to "an embodiment," "one embodiment," "some embodiments," "one particular embodiment," or "other embodiments," or the like, means that a particular feature, structure, or characteristic described in connection with the embodiments is included in at least some embodiments, but not necessarily all embodiments, of the invention. The various appearances "an embodiment," "one embodiment," "some embodiments," "one particular embodiment," or "other embodiments," or the like, are not necessarily all referring to the same embodiments.

If this specification states a component, feature, structure, or characteristic "may", "might", or "could" be included, that particular component, feature, structure, or characteristic is not required to be included. If the specification or claim refers to "a" or "an" element, that does not mean there is only one of the element. If the specification or claims refer to "an additional" element, that does not preclude there being more than one of the additional element.

As used herein in the specification and claims, including as used in the examples and unless otherwise expressly specified, all numbers may be read as if prefaced by the word "about" or "approximately," even if the term does not expressly appear. The phrase "about" or "approximately" may be used when describing magnitude and/or position to indicate that the value and/or position described is within a reasonable expected range of values and/or positions. For example, a numeric value may have a value that is +/−0.1% of the stated value (or range of values), +/−1% of the stated value (or range of values), +/−2% of the stated value (or range of values), +/−5% of the stated value (or range of values), +/−10% of the stated value (or range of values), etc. Any numerical range recited herein is intended to include all sub-ranges subsumed therein.

Additionally, any method of performing the present disclosure may occur in a sequence different than those described herein. Accordingly, no sequence of the method should be read as a limitation unless explicitly stated. It is recognizable that performing some of the steps of the method in a different order could achieve a similar result.

In the claims, as well as in the specification above, all transitional phrases such as "comprising," "including," "carrying," "having," "containing," "involving," "holding," "composed of," and the like are to be understood to be open-ended, i.e., to mean including but not limited to. Only the transitional phrases "consisting of" and "consisting essentially of" shall be closed or semi-closed transitional phrases, respectively, as set forth in the United States Patent Office Manual of Patent Examining Procedures.

In the foregoing description, certain terms have been used for brevity, clearness, and understanding. No unnecessary limitations are to be implied therefrom beyond the requirement of the prior art because such terms are used for descriptive purposes and are intended to be broadly construed.

Moreover, the description and illustration of various embodiments of the disclosure are examples and the disclosure is not limited to the exact details shown or described.

What is claimed:

1. A nozzle for a welding machine used to heat weld materials together; said nozzle comprising:
a tubular member having a first end and a second end;
a connector assembly engaged with the first end and being adapted to be engaged with a hose extending outwardly from a housing of the welding machine;
a welding head provided at the second end of the tubular member, wherein the welding head is substantially L-shaped when viewed from a first direction and the welding head comprises a first leg that is engaged with the second end of the tubular member and a second leg that extends outwardly from the first leg, wherein when the nozzle is in a non-welding position, the welding head is located a distance outwardly beyond a second side of the housing, and when the nozzle is in the welding position, the welding head is located inwardly of the second side of the housing; and wherein the nozzle travels through a vertical plane when moving between the non-welding position and the welding position; and wherein the nozzle is adjustably engaged with a mounting bracket by a spring-loaded mechanism; and the spring-loaded mechanism permits the nozzle to float up and down relative to the mounting bracket during operation of the welding machine;
a pair of flanges; wherein the pair of flanges are spaced apart from each other and are spaced so as to be positioned adjacent first and second mounting plates, wherein each of the flanges is defined a slot through which a respective fastener is selectively engaged; and
wherein the nozzle is operative to pivot between a first and second position by engaging a pivot rod from locking engagement with the nozzle mounting bracket; wherein the pivot rod is operative to rotate about an axis extending along its length whereby the nozzle is now free to be pivoted between the first and the second position wherein the welding head lies outside the housing in the second position.

2. The nozzle as defined in claim 1, wherein the welding head is substantially T-shaped when viewed from a second direction that is oriented at 90° to the first direction.

3. The nozzle as defined in claim 2, wherein the second leg comprises a planar member that is oriented generally at right angles to the first leg of the welding head.

4. The nozzle as defined in claim 3, wherein the planar member includes an upper surface and an opposed lower surface; wherein the lower surface is adapted to be oriented generally parallel to a material surface upon which the welding machine is positioned during a welding operation.

5. The nozzle as defined in claim 4, wherein one or both of the upper and lower surfaces of the planar member defines a plurality of apertures therein that are in communication with a bore of the nozzle and are adapted to allow heated air to flow outwardly from the bore of the nozzle and into air surrounding an exterior of the planar member.

6. The nozzle as defined in claim 5, wherein the planar member has a first side edge and a second side edge and an end that extends between the first and second side edges; and wherein one or more of the first and second side edges and the end defines an aperture therein; and wherein the aperture is in communication with a bore of the nozzle and is adapted to allow heated air to flow from the bore and into air surrounding an exterior of the planar member.

7. The nozzle as defined in claim 2, wherein the nozzle is provided with a handle perpendicular to the nozzle; and wherein the nozzle handle is provided in a first color and is indicative of the nozzle handle being sufficiently cool enough to touch when the nozzle is operational.

8. The nozzle as defined in claim 2, wherein the respective fastener is aligned through the slot in adjacent mounting plates, thereby securing the nozzle to the nozzle mounting bracket.

9. The nozzle as defined in claim 2, wherein the fastener is operative to freely move within the slot via a spring loaded mechanism.

* * * * *